United States Patent [19]
McNeilly et al.

[11] Patent Number: 6,024,882
[45] Date of Patent: *Feb. 15, 2000

[54] PROCESS AND APPARATUS FOR WATER DECONTAMINATION

[75] Inventors: Michael McNeilly, Redwood Shores; Reid Bowman, Ojai; Terry Applebury, Lafayette; Doug Gustafson, Antioch, all of Calif.

[73] Assignee: Applied Process Technology, Inc., Redwood Shores, Calif.

[*] Notice: This patent is subject to a terminal disclaimer.

[21] Appl. No.: 09/129,371

[22] Filed: Aug. 5, 1998

Related U.S. Application Data

[63] Continuation-in-part of application No. 08/978,752, Nov. 26, 1997, Pat. No. 5,851,407
[60] Provisional application No. 60/055,135, Aug. 8, 1997, provisional application No. 60/057,821, Sep. 4, 1997, and provisional application No. 60/061,284, Oct. 7, 1997.

[51] Int. Cl.$^7$ ..................................................... C02F 1/78
[52] U.S. Cl. ..................... 210/759; 210/96.1; 210/192; 210/205; 210/220; 210/760; 261/DIG. 42
[58] Field of Search .................... 210/96.1, 192, 210/205, 220, 759, 760; 261/DIG. 42

[56] References Cited

U.S. PATENT DOCUMENTS

| | | | |
|---|---|---|---|
| 4,674,888 | 6/1987 | Carlson | 366/337 |
| 5,273,664 | 12/1993 | Schulz | 210/759 |
| 5,415,785 | 5/1995 | Braden et al. | 210/752 |
| 5,578,205 | 11/1996 | Martin | 210/199 |
| 5,609,766 | 3/1997 | Schneider et al. | 210/662 |

FOREIGN PATENT DOCUMENTS

| | | | |
|---|---|---|---|
| 0 257 983 A2 | 3/1988 | European Pat. Off. | C02F 11/08 |
| 0 561 458 A1 | 12/1993 | European Pat. Off. | C02F 1/78 |
| 0 577 157 A2 | 1/1994 | European Pat. Off. | D21C 9/16 |
| 0 701 972 A1 | 9/1994 | European Pat. Off. | C02F 1/32 |
| 90 14 034 U | 2/1991 | Germany | B67D 5/54 |
| 581 493 | 9/1976 | Switzerland | B01F 5/00 |

OTHER PUBLICATIONS

Singh, et al, "Pilot–Scale Evaluation of the Advanced Oxidation Process for Treatment of Gasoline Contaminated Groundwater: A Case Study", 10497 The Annual WPCF Conference 63rd, pp. 1–13, Tables 1–8, Figs. 1–12, and listed Bibliography.

Glaze, et al., "Advanced Oxidation Processes for Treating Groundwater Contaminated With TCE and PCE: Laboratory Studies," Journal AWWA, pp. 57–63 (1988).

Karimi, et al., "Evaluating an AOP for TCE and PCE Removal," Journal AWWA, pp. 42–53 (1997).

Karimi, "Treatment of Groundwater Contamination with TCE & PCE by Advanced Oxidation Process," Slide Presentation, 23 pages (1996).

Martin, et al., "Use of Static Mixer for Oxidation and Disinfection by Ozone," Ozone Science & Engineering, 16, pp. 455–473 (1994).

(List continued on next page.)

*Primary Examiner*—David A. Simmons
*Assistant Examiner*—Betsey J. Morrison
*Attorney, Agent, or Firm*—Limbach & Limbach, L.L.P.

[57] ABSTRACT

Oxidizable contaminants in water are destroyed rapidly and efficiently by exposing the water to oxidizing conditions under pressure. Specifically, a single dose of hydrogen peroxide may be injected into the water, followed by the repeated injection and mixing of low doses of ozone. In each such high intensity mixing/reaction stage, ozone is injected at a pressure, velocity, and direction approximately matching that of the contaminated water flow. High intensity mixing under pressure facilitates rapid and complete oxidation of the contaminants with minimal stripping of volatile contaminants and waste of undissolved ozone. Residual ozone levels after high intensity mixing may be carefully monitored and minimized by adjusting the injection of hydrogen peroxide and ozone in order to suppress the formation of bromate. Additional contaminants may be removed by passing the treated water through activated carbon beds.

13 Claims, 13 Drawing Sheets-

OTHER PUBLICATIONS

Richards, et al., "Mass Transfer Coefficients for the Ozone–Water System," AIChE Symposium Series, 73 (1966), pp. 213–224 (1976).

Krasner, et al., "Impact of Water Quality and Operational Parameters on the Formation and Control of Bromate During Ozonation," Water Supply, 13 (1), pp. 145–156 (1995).

Siddiqui, et al., "Bromate Ion Formation: A Critical Review," Journal AWWA, pp. 58–69 (1995).

Siddiqui, et al., "Alternative Strategies for Removing Bromate," Journal AWWA, pp. 81–96 (1994).

von Gunten, et al., "Bromate Formation in Advanced Oxidation Processes," *Journal AWWA*, pp. 53–65 (1996).

Karpel Vel Leitner, et al., "Oxidation of Methyl tert–Butyl Ether (MTBE) and Ethyl tert–Butyl Ether (ETBE) By Ozone and Combined Ozone/Hydrogen Peroxide," Ozone Science & Engineering, 16, pp. 41–54 (1994).

Dyksen, et al., "In–line Ozone and Hydrogen Peroxide Treatment for Removal of Organic Chemicals," AWWA Research Foundation, 88 pages (1992).

U. von Gunten and Y. Oliveras, Kinetics of the Reaction Between Hydrogen Peroxide and Hypobromous Acid: Implication on Water Treatment and Natural Systems, Swiss Federal Institute for Environmantal Science and Technology, EAWAG, CH–8600 Dubendorf, Switzerland, Wat. Res. vol. 31, No. 4. pp. 900–906, (1997) Elseviver Science Ltd.

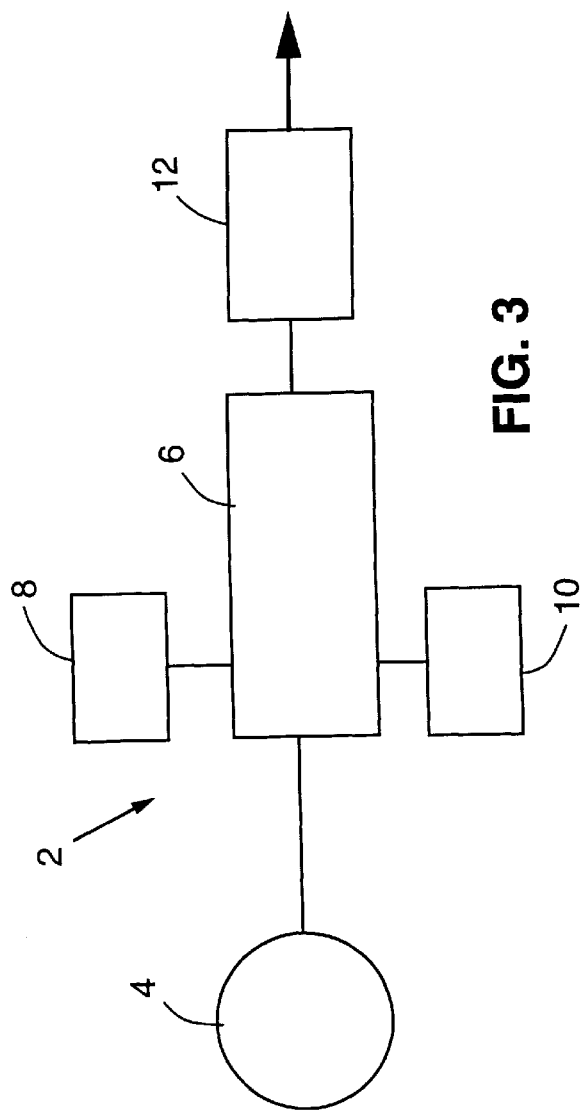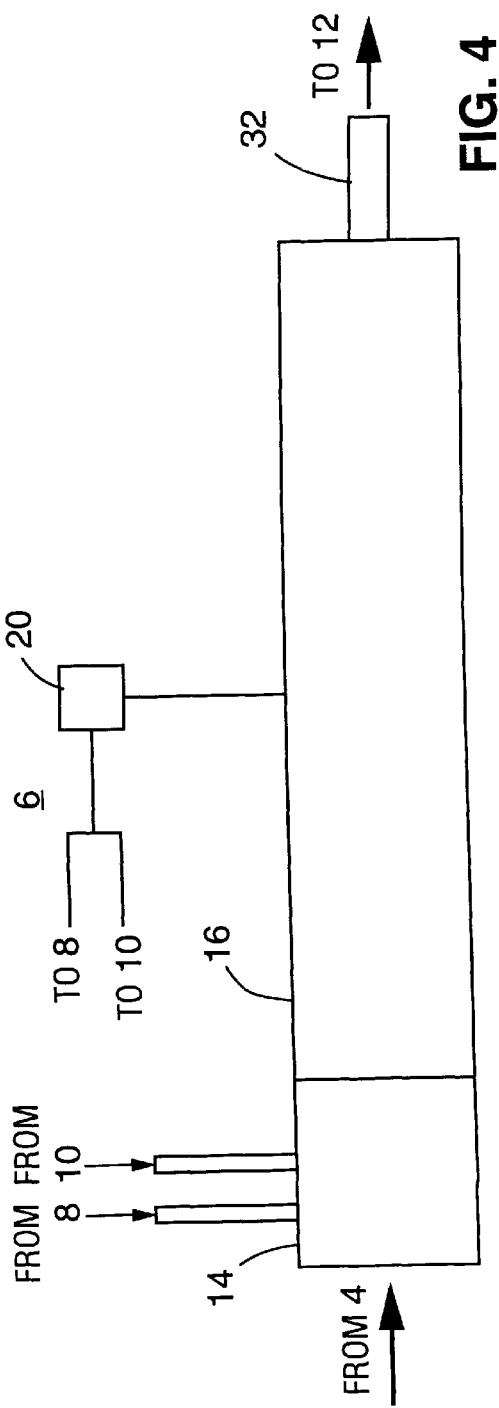

PROCESS AND APPARATUS FOR WATER DECONTAMINATION

CROSS-REFERENCE TO RELATED APPLICATIONS

This is a continuation-in-part application of U.S. nonprovisional application No. 08/978,752, filed Nov. 26, 1997, now U.S. Pat. No. 5,851,407, entitled "Process and Apparatus For Oxidation of Contaminants in Water," inventors Michael McNeilly, Terry Applebury, Reid Bowman, and Doug Gustafson. This continuation-in-part application also claims the benefit of (1) U.S. provisional application No. 60/055,135, filed Aug. 8, 1997, entitled "Method and Apparatus for Ammonium Perchlorate Removal", inventors Michael McNeilly, Terry Applebury, and Doug Gustafson; (2) U.S. provisional application No. 60/057,821, filed Sep. 4, 1997, entitled "Method and Apparatus for Removal of Perchlorate Contamination From Water", inventors Michael McNeilly, Terry Applebury, Reid Bowman, and Doug Gustafson; and (3) U.S. provisional application No. 60/061,284, filed Oct. 7, 1997, entitled "Method and Apparatus for Removal of Bromate Concentration From Water", inventors Michael McNeilly, Terry Applebury, Reid Bowman, and Doug Gustafson. The text of each of these related applications is hereby incorporated by reference.

BACKGROUND OF THE INVENTION

1. Field of the Invention

The present invention relates to water decontamination, and more particularly, to apparatuses and processes for removing organic contaminants by $OH^-$ oxidization in water by mixing ozone and hydrogen peroxide into contaminated water.

2. Description of the Related Art

Heightened awareness of the risks to human health posed by environmental contaminants has led to imposition of stringent regulation on levels of contamination in drinking water. For example, the current maximum concentration of trichloroethylene (TCE) permitted by the United States Environmental Protection Agency is 5 ppb. TCE belongs to a class of compounds known as volatile organic contaminants, or VOC's. Because of their toxicity and/or carcinogenic properties, VOC's must be removed before water can be utilized for most purposes.

Controlled oxidation of hazardous organic contamination in contaminated water is increasingly accepted for decontamination. One example is the so-called "advanced oxidation process" (AOP), wherein ozone ($O_3$) and hydrogen peroxide ($H_2O_2$) introduced into water react with each other to form the hydroxyl radical (HO·), a powerful oxidizing species. Hydrogen peroxide, ozone, and hydroxyl radical then come into contact with and oxidize contaminants, destroying them. Glaze and Kang, *J. Amer. Water Works Assoc.*, 80, 51 (1988) describe an advanced oxidation process wherein ozone ($O_3$) and hydrogen peroxide ($H_2O_2$) are introduced into contaminated water at atmospheric pressure.

Known AOP decontamination systems suffer from a number of serious disadvantages. First, the rate of ozone destruction in conventional systems has been documented as being initially very rapid. However, no corresponding rapid destruction of contaminants during the initial mixing of ozone and hydrogen peroxide in water has been observed or reported. Thus, conventional oxidation decontamination processes utilizing ozone are relatively inefficient, consuming large quantities of relatively expensive ozone while eliminating only modest amounts of contaminants.

Therefore, it is desirable to design oxidation decontamination processes and apparatuses utilizing ozone that enhance mixing, and hence reduce the time required for ozone, hydrogen peroxide, and/or the hydroxyl radical to encounter contaminants present in the water, thereby maximizing oxidation.

A second disadvantage of known AOP decontamination systems is formation of unwanted disinfection byproducts. For example, bromide ions ($Br^-$), naturally present in the water, can undergo a series of reactions to produce bromate ($BrO_3^-$):

$$3Br^- + O_3 \text{ (only)} \rightarrow 3BrO^- \quad (1)$$

$$BrO^- + (O_3 \text{ or } HO·) \rightarrow BrO_3^- \quad (2)$$

Bromate has recently been designated as a suspected carcinogen, and the U.S.E.P.A. has established a maximum level for drinking water of 10 µg/L. It is thus important to prevent or minimize bromate formation during decontamination of potable water.

In step (1) above, neither the hydroxyl radical (HO·) nor hydrogen peroxide alone oxidize bromide to form hypobromite ($BrO^-$). Moreover, reaction (2) must compete with the conversion of hypobromite back to bromide that occurs in the presence of hydrogen peroxide:

$$BrO^- + H_2O_2 \rightarrow Br^- \quad (3)$$

Thus when hydrogen peroxide concentration is greater, reaction (3) is favored and the formation of bromate is discouraged.

Therefore, it is desirable to develop decontamination processes and apparatuses utilizing ozone and hydrogen peroxide wherein residual ozone concentrations are minimized and hydrogen peroxide concentrations are maximized in order to suppress the formation of bromate.

A third disadvantage of conventional ozone decontamination systems is the limited solubility of ozone in water at atmospheric pressure. FIG. 1 shows that the solubility of ozone in water increases with higher pressure. However, conventional oxidation decontamination systems introduce ozone at only atmospheric pressure, limiting the amount of ozone that can be dissolved in the water.

Therefore, it is desirable to design decontamination processes and apparatuses wherein ozone is introduced and maintained in solution within the contaminated water under greater than atmospheric pressure. As a result, more ozone is dissolved in the water and available to react with hydrogen peroxide to form $OH^-$ and oxidizable contaminants.

A fourth disadvantage is the limited concentration of ozone normally present in the reactant gas stream that is mixed with the water. FIG. 2 shows that ozone solubility in water increases with increasing ozone in the gas phase. Conventional oxidation systems utilize gas streams containing only about 1–4% ozone by weight in air, effectively limiting the amount of ozone soluble in water.

An additional problem associated with the introduction of ozone in a stream of air is that the air can strip the water of VOC's and ozone, hindering the oxidation process and creating a waste gas stream that must be separately decontaminated.

Therefore, it is desirable to design oxidation decontamination processes and apparatuses wherein ozone is generated from oxygen, constituting a larger percentage of the reactant gas introduced into the water. This results in more ozone being dissolved in the water and preventing stripping of ozone and VOC's.

A fifth disadvantage is that the ozone and hydrogen peroxide are generally introduced into a side stream of contaminated water that has been diverted from the main flow in order to receive the ozone and the hydrogen peroxide. The resulting elevated concentrations of ozone in the side stream relative to the entire flow creates several problems. First, subsequent introduction of the side stream may result in uneven mixing of the ozone in the overall water flow. Second, introduction of the ozone within the smaller volume of the side stream necessarily increases the local concentration of ozone and may lead to increased bromate formation.

Therefore, it is desirable to design decontamination processes and apparatuses wherein ozone and hydrogen peroxide are injected "in-line" with the entire contaminated water flow to achieve uniform and rapid mixing of ozone, and minimize local concentrations of ozone.

SUMMARY OF THE INVENTION

Water decontamination processes and apparatuses in accordance with the present invention rely upon injection of hydrogen peroxide and ozone under pressure directly into the contaminated water flow, followed by high intensity mixing and reaction under pressure. During the course of decontamination in accordance with the present invention, ozone and hydrogen peroxide react with each other to form the highly reactive hydroxyl radical, and also react with contaminants. The resulting high concentration of hydroxyl radical, the relatively low concentration of residual ozone, and the rapid contact between oxidants and contaminants, enhance the efficiency and the effectiveness of oxidation while minimizing the formation of bromate. Decontamination in accordance with the present invention is particularly effective where hydrogen peroxide is injected in one initial dose followed by the injection of ozone in multiple stages.

A better understanding of the features and advantages of the present invention will be obtained by reference to the following detailed description and accompanying figures.

BRIEF DESCRIPTION OF THE DRAWINGS

FIG. 3 illustrates a single stage decontamination system in accordance with the first embodiment of the present invention.

FIG. 4 illustrates a high intensity mixing/reaction stage in accordance with the first embodiment of the present invention.

DETAILED DESCRIPTION OF THE INVENTION

1. Introduction

Figure 1:
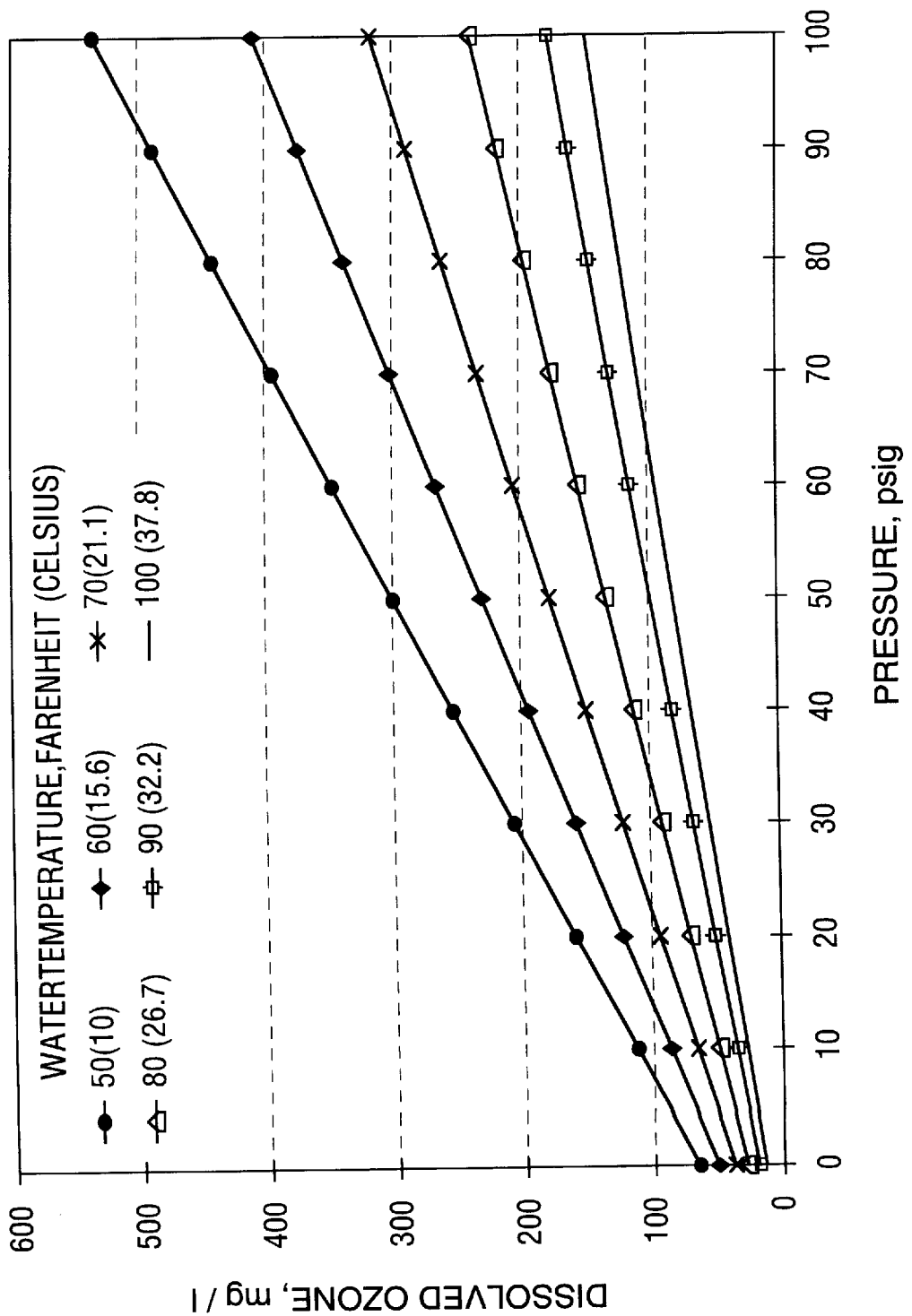
FIG. 1 plots overall pressure versus the concentration of ozone dissolved in water, based upon a 10% (v) concentration of ozone in the gas phase for conventional oxidation decontamination.

In this application, the term "COD" refers to "chemical oxygen demand" compounds—chemicals that dissolve in water and which can be oxidized.

The oxidation decontamination processes and apparatuses of the present invention are uniquely useful to 1) maximize destruction of oxidizable contaminants; 2) minimize costs associated with the consumption of expensive oxidants; 3) eliminate costs associated with the "off-line" introduction of ozone into a side stream of contaminated water; and 4) control quantities of bromate formed as a result of oxidation. The heightened efficiency and effectiveness of oxidation in accordance with the present invention should permit implementation of decontamination projects previously considered unfeasible due to the degree of contamination and the expense required.

Oxidation of COD compounds in water with ozone and hydrogen peroxide in accordance with the present invention is accomplished with a reactor having at least one, and preferably more than one, high intensity mixing/reaction stage. Each high intensity mixing/reaction stage provides an environment wherein ozone and hydrogen peroxide are uniformly mixed with a contaminated water flow within a period of approximately thirty seconds or less, and the oxidation reactions then proceed with a minimum of residual ozone present.

During each high intensity mixing/reaction stage, ozone and hydrogen peroxide react with each other to form the hydroxyl radical (HO·). The hydroxyl radical, ozone, and hydrogen peroxide then oxidize the COD compounds, destroying them.

FIG. 3 shows a diagram of a single stage water decontamination system 2 in accordance with a first embodiment of the present invention. Decontamination system 2 receives contaminated water from a contaminated water source 4. Decontamination system 2 includes at least one high intensity mixing/reaction stage 6, an ozone source 8, a hydrogen peroxide source 10, and an optional post-oxidation treatment area 12.

A step-by-step description of the water decontamination process and apparatus in accordance with the first embodiment is set forth below.

2. Water Source

Contaminated water flows into decontamination system 2 under an inlet pressure from water source 4. Water from water source 4 typically enters decontamination system 2 at a pressure of greater than 0 psig, with initial pressures most typically between 30 and 50 psig. If water source 4 is a well, the ground water is produced at greater than 5 psig. If water source 4 is a storage tank, the water is generally pressurized by pump to above 5 psig.

The flow rate of water entering high intensity mixing/reaction stage 6 from water source 4 is typically from about 1 to 3000 gallons per minute. System 2, however, is not limited to handling 3000 gallons per minute.

3. Ozone and Hydrogen Peroxide Sources

Water decontamination system 2 includes an ozone source 8 and a hydrogen peroxide source 10 feeding into high intensity mixing/reaction stage 6.

Figure 2:
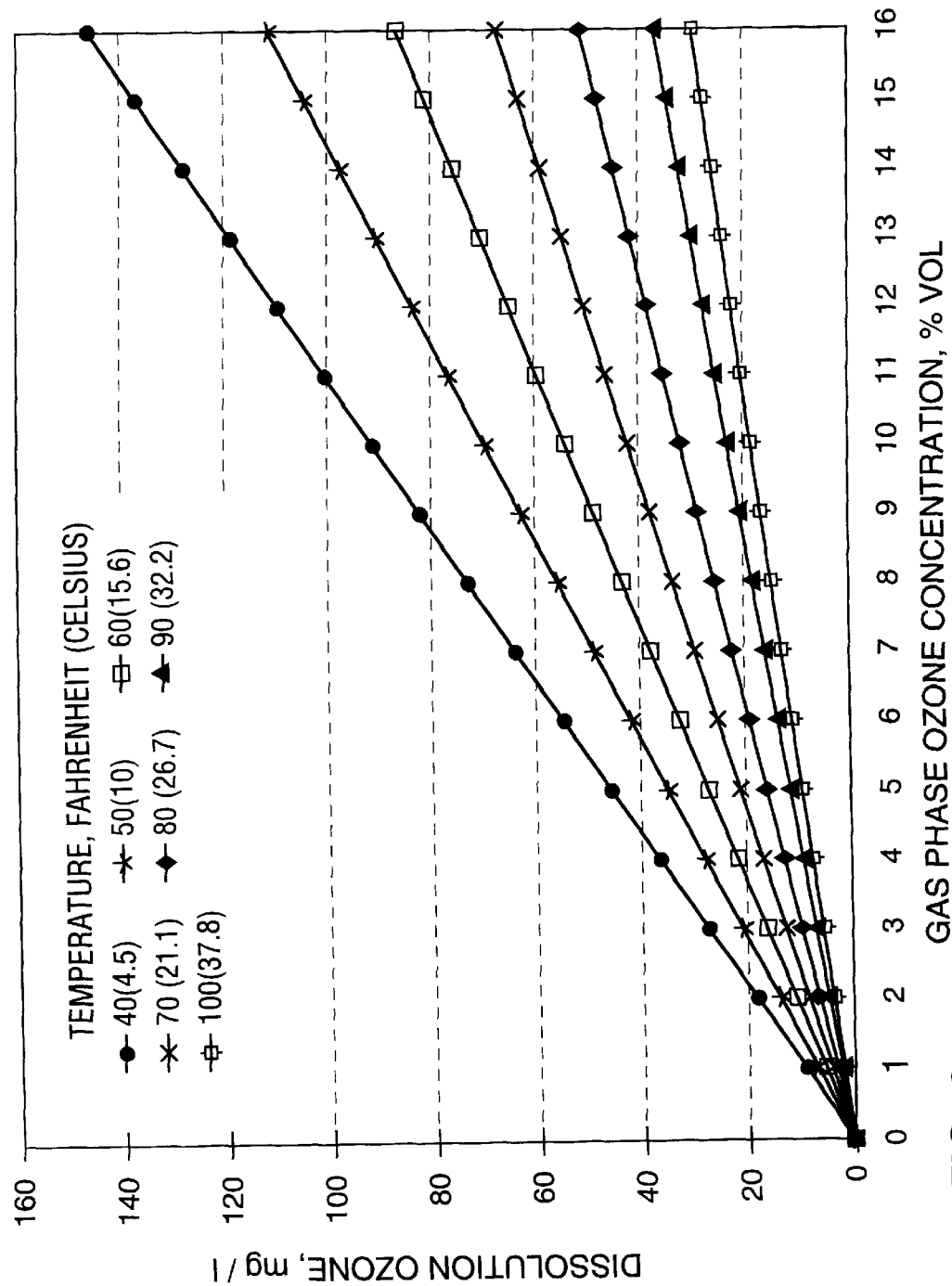
FIG. 2 plots the concentration of ozone in the gas phase versus the resulting concentration of ozone dissolved in water for conventional oxidation decontamination.

The processes and apparatuses in accordance with the present invention preferably utilize ozone generated from oxygen rather than from air. Generation of ozone in this manner results in a supply of gas from ozone source 8 containing substantial concentrations of ozone. As shown in FIG. 2, these elevated gas phase ozone concentrations lead to larger quantities of ozone being dissolved in the contaminated water flow.

Specifically, the ozone generator utilized in accordance with the first embodiment of the present invention is an ASTeX Model 8200D modified to maintain a pressure in the generator higher than that of the contaminated water flow. This modification precludes water from entering and disabling the generator. Generation of ozone from oxygen in this manner produces a stream of gas having ozone concentrations between 1 and 14% by weight in oxygen, with most typical ozone concentrations between approximately 5% and 9% by weight.

An additional benefit of utilizing ozone in a flow of oxygen from ozone source 8 is that oxygen is itself an oxidant. Because groundwater flowing directly into high intensity mixing/reaction stage 6 from a well is typically devoid of oxygen, the introduction of oxygen along with ozone replenishes the oxygen content of the water and may oxidize contaminants that are organic, inorganic, or biological in nature.

Hydrogen peroxide source 10 is generally commercially supplied. Hydrogen peroxide of concentration up to approximately 70% by weight in water is typically utilized, as hydrogen peroxide in concentrations greater than 70% pose the danger of explosion.

4. High Intensity Mixing/Reaction Stage

As shown in FIG. 3, contaminated water from water source 4 is transferred under an inlet pressure >0 psig to high intensity mixing/reaction stage 6. FIG. 4 shows a detailed view of a high intensity mixing/reaction stage 6 in accordance with one embodiment of the present invention, comprising injection port 14, high intensity mixing/reaction zone 16, and ozone adjustment means 20.

One key feature of high intensity mixing/reaction stage is that water enters under an inlet pressure greater than 0 psig and the inlet ozone pressure is greater than the inlet water pressure. Maintaining the inlet ozone pressure greater than the inlet water pressure throughout the high intensity mixing/reaction stage facilitates effective oxidation of contaminants by maximizing the ozone introduced into the water flow and also minimizes ozone consumption by reducing wasted ozone not dissolved in the solution. Each of the individual components of the high intensity mixing/reaction stage is discussed in detail below.

A. Injection

As contaminated water flows into high intensity mixing/reaction stage 6 under an inlet pressure of greater than 0 psig, ozone and hydrogen peroxide are injected.

One key feature of decontamination processes and apparatuses in accordance with the present invention is that the ozone and hydrogen peroxide are injected at pressures, velocities, and directions approximately matching those of the contaminated water flow. This manner of injection of the oxidizing agents promotes rapid and uniform mixing, thereby enhancing reaction between ozone, hydrogen peroxide, hydroxyl radical, and contaminants present in the water.

A second key feature of the present invention is that hydrogen peroxide and ozone are injected directly into the entire contaminated water flow, rather than into a side stream diverted for this purpose. This "in-line" injection of oxidizing agents eliminates the problems of uneven mixing and elevated local ozone concentrations associated with diversion of a side stream of contaminated water. "In-line" injection also eliminates the need for the additional expensive and complex pumps and piping required for diversion and reintroduction of such a side stream of contaminated water.

Figure 5:
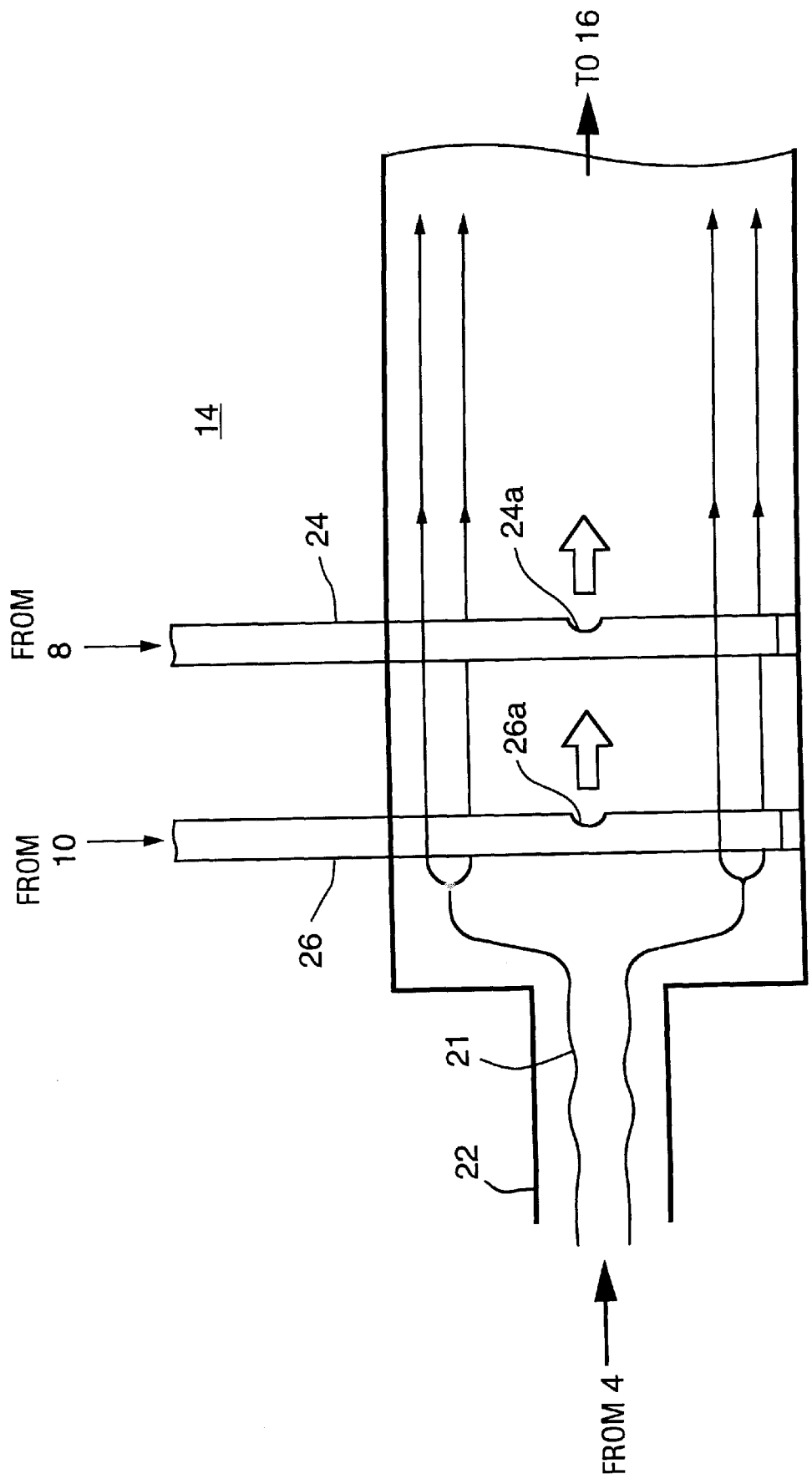
FIG. 5 illustrates an injection port in accordance with the first embodiment of the present invention.

FIG. 5 shows an injection port 14 in accordance with the first embodiment of the present invention. Injection port 14 has influent pipe 22, ozone sparge tube 24, and hydrogen peroxide sparge tube 26. Ozone sparge tube 24 and hydrogen peroxide sparge tube 26 project into the interior of injection port 14.

Contaminated water enters injection port 14 through influent pipe 22. Injection port 14 is designed to afford the influent contaminated water an optimum spatial flow rate between approximately 2.0 ft/sec and 15 ft/sec, with 6.5 ft/sec being preferred. The contaminated water then flows through injection port 14 and around ozone sparge tube 24 and hydrogen peroxide sparge tube 26, as shown by arrows 21 that point in the downstream direction.

Hydrogen peroxide sparge tube 26 defines at least one, and preferably more than one, hydrogen peroxide orifice 26*a* facing downstream. Hydrogen peroxide from the hydrogen peroxide source (not shown) is pressurized and directed into hydrogen peroxide sparge tube 26. The hydrogen peroxide flows through hydrogen peroxide sparge tube 26 until it encounters hydrogen peroxide orifice 26*a*. The hydrogen peroxide then exits hydrogen peroxide sparge tube 26 through hydrogen peroxide orifice 26*a* and enters the contaminated water flow.

The volume of hydrogen peroxide flowing into hydrogen peroxide sparge tube 26 and the size of hydrogen peroxide orifice 26*a* are selected to ensure that the hydrogen peroxide is introduced into the contaminated water flow at a spatial flow rate approximately matching that of the contaminated water flow. The orientation of the hydrogen peroxide orifice 26*a* ensures that the hydrogen peroxide is injected in the direction of the water flow.

Ozone sparge tube 24 defines at least one, and preferably more than one, ozone orifice 24*a* facing downstream. Ozone-containing gas from the ozone source (not shown) is pressurized and directed into ozone sparge tube 24. The ozone-containing gas flows through ozone sparge tube 24 until it encounters ozone orifice 24*a*. The ozone containing gas then exits ozone sparge tube 24 through ozone orifice 24*a* and enters the contaminated water flow.

The volume of flow of ozone-containing gas into ozone sparge tube 24 and the diameter of ozone orifice 24*a* are selected to ensure that the ozone-containing gas flows into the contaminated water flow at a spatial flow rate approximately matching that of the water. As with hydrogen peroxide orifice 26a, the orientation of ozone orifice 24a ensures that the ozone-containing gas is injected in the same direction as the contaminated water flow.

Although FIG. 5 shows hydrogen peroxide sparge tube 26 being upstream of ozone sparge tube 24, the order is not significant and the hydrogen peroxide can be introduced to the contaminated water flow either immediately before or after the ozone. The ozone sparge tube and the hydrogen peroxide sparge tube can also be positioned side by side, so long as the manner of injection matches the pressure, velocity, and direction of the water flow.

Ozone gas and hydrogen peroxide are introduced with an overall mole ratio of $H_2O_2:O_3$ of between about 0.1 and 10, with a typical range of 0.5 to 6.0. It is important to recognize that the above-referenced ratios represent the total amount of ozone and hydrogen peroxide injected in the entire decontamination system. The $H_2O_2:O_3$ mole ration present at individual high intensity mixing/reaction stages may be much higher, particularly where the total amount of hydrogen peroxide is injected at a single location "up front" of the high intensity mixing/reaction stages in which ozone is injected. A detailed discussion of "up front" hydrogen peroxide injection follows under section 6 of this detailed description of the invention.

Injection of hydrogen peroxide and ozone in the above-referenced ratios ensures that residual ozone concentrations are minimized to inhibit hypobromite formation (as shown above by reaction (1)), while hydrogen peroxide concentrations are maximized to encourage the conversion of hypobromite back to bromide (as shown above by reaction (3)). Overall $H_2O_2:O_3$ mole ratios higher than 4 may be necessary in order to eliminate COD that is preferentially oxidized by hydrogen peroxide, allowing the excess hydrogen peroxide to react with ozone to form the hydroxyl radical. The precise amounts and ratios of ozone and hydrogen peroxide ultimately introduced into the water flow are functions of the particular varieties of COD present and their concentrations.

In a 1000 gal/min capacity model system in accordance with the present invention, injection port 14 has a diameter of 8" and water flows into injection port 14 at a rate of 1000 GPM. The resulting spatial flow rate of the contaminated water through injection port 14 is 6.5 ft/sec. The hydrogen peroxide sparge tube defines two hydrogen peroxide orifices, each having a diameter of 0.004", from which hydrogen peroxide flows at between 0.0001 and 0.00015 $ft^3$/min resulting an a spatial velocity of approximately 6 ft/sec. The ozone sparge tube defines two ozone orifices, each having a diameter of 0.14", from which ozone flows at approximately 1 $ft^3$/min, resulting in a spatial velocity for the ozone of approximately 6 ft/sec.

In a second, smaller capacity model system in accordance with the present invention, injection port 14 has a diameter of ¾". Water flows into injection port 14 at a rate of approximately 6 gal/min. The resulting spatial flow rate of the contaminated water through injection port 14 is approximately 6.5 ft/sec. The hydrogen peroxide sparge tube defines a single hydrogen peroxide orifice having a diameter of 0.002", from which hydrogen peroxide flows at approximately 0.00005 $ft^3$/min resulting in a spatial velocity of approximately 6 ft/sec. The ozone sparge tube defines two ozone orifices, each having diameters of 0.002", from which ozone flows at approximately 0.0019 $ft^3$/min, resulting an a spatial velocity for the ozone of approximately 6 ft/sec. Only a single hydrogen peroxide orifice is utilized in the smaller capacity system because of physical constraints in forming an orifice small enough to accommodate the lesser hydrogen peroxide flow required.

B. High Intensity Mixing

Following introduction of the ozone and hydrogen peroxide into the contaminated water within injection port 14, the $O_3/H_2O_2/H_2O$ combination is maintained at near-initial pressure (greater than 0 psig) and directed into high intensity mixing/reaction zone 16.

High intensity mixing overcomes inherent mass-transfer limitations of ozone gas into water. High intensity mixing also promotes a uniform mixture of oxidants in the water, thereby optimizing the probability that the hydroxyl radical will come into contact with and successfully oxidize COD. High intensity mixing can be accomplished by either a static mixer or a mixer having moving parts.

The design of a high intensity mixing/reaction zone in accordance with the present invention is a function of: 1) the flow rate of contaminated water; 2) the amounts of ozone and hydrogen peroxide injected; 3) the pressure drop across the high intensity mixing; and 4) the residence time required to complete high intensity mixing and reaction.

One criterion for high intensity mixing in accordance with the present invention is that the pressure drop through the high intensity mixing is between about 0.1 to 10 psig. In addition, ozone and hydrogen peroxide concentrations should be mixed within 1% uniformity. Also, the 1% uniformity of hydrogen peroxide and ozone concentrations should be achieved by mixing for less than thirty seconds, and preferably within one second.

Figure 6:
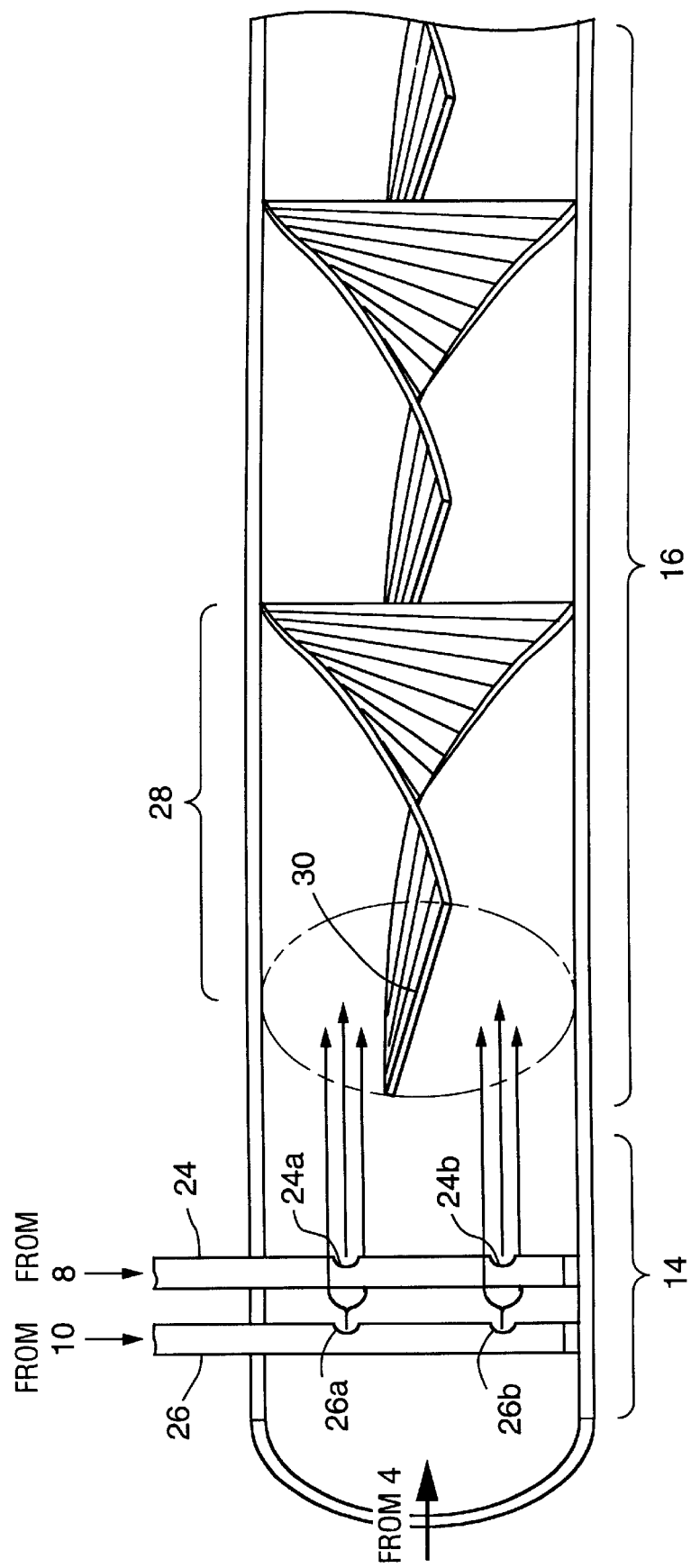
FIG. 6 illustrates the orientation of the injection port relative to the initial portion of the high intensity mixing/reaction zone in accordance with the first embodiment of the present invention.

FIG. 6 shows the orientation of injection port 14 relative to the initial portion of a high intensity mixing/reaction zone 16 in accordance with the first embodiment of the present invention. Injection port 14 includes an ozone sparge tube 24 that defines two ozone orifices, 24a and 24b. Similarly, hydrogen peroxide sparge tube 26 defines two ozone orifices, 26a and 26b.

The initial portion of high intensity mixing/reaction zone 16 consists of a series of static mixing elements 28 having a leading edge 30. Leading edge 30 defines two high intensity mixing phases, one for water traveling on one side of the leading edge 30, and one for water traveling on the other side of leading edge 30.

A key feature the high intensity mixing/reaction zone 16 of the first embodiment is that leading edge 30 lies perpendicular to both the ozone sparge tube 24 and the hydrogen peroxide sparge tube 26 at a height of half the diameter of high intensity mixing/reaction zone 16. This spatial orientation of leading edge 30 relative to ozone sparge tube 24 and hydrogen peroxide sparge tube 26 maximizes the solubilization of ozone and maximizes the uniformity of concentration of both ozone and hydrogen peroxide in the contaminated water flow. This is because ozone injected through first ozone orifice 24a and hydrogen peroxide injected through first hydrogen peroxide orifice 26a enter one phase of high intensity mixing/reaction zone 16, while ozone injected through second ozone orifice 24b and hydrogen peroxide injected through second hydrogen peroxide orifice 26b enter the other phase of high intensity mixing/reaction zone 16.

An exemplary high intensity mixing/reaction zone 16 of the 1000 gal/min capacity model utilizes a static mixer, the Chemineer, Inc. Model 8KJS8. This model has a diameter of 8", a length of 8', and a flow rate of 1000 gal/min. The pressure drop across the mixing zone is 4 psig. Greater than 99.5% of the ozone injected into the water flow is ultimately solubilized into the contaminated water using this embodiment.

A high intensity mixing/reaction zone 16 of the 6 gal/min capacity model in accordance with the first embodiment of the present invention utilizes a static mixer having a diameter of ¾", a length of 8", and a flow rate of 6 gal/min. Because the injection port of this smaller-capacity model includes only a single hydrogen peroxide orifice, this orifice is positioned approximately at a height ⅜".

When subjected to high intensity mixing as described above, contaminated water typically contains a concentration of about 0.1 to 10 ppm of ozone by weight, and a concentration of about 0.1 to 70 ppm of hydrogen peroxide by weight.

C. Reaction

Certain varieties of COD are highly susceptible to oxidation and may already be substantially oxidized at the conclusion of the high intensity mixing. However, other types of COD are more resistant to oxidation and may therefore require a further period of exposure to the oxidizing species present in the water. Therefore, the latter portion of high intensity mixing/reaction zone 16 may include a region where the mixture is simply maintained under pressure while oxidation occurs.

The total residence time of the $O_3/H_2O_2/H_2O$ mixture in high intensity mixing/reaction zone 16 is that time necessary to consume almost all of the ozone present in the mixture. This residence time is suitably between 0.1 and 30 seconds, and preferably between 2 and 10 seconds.

Figure 7:
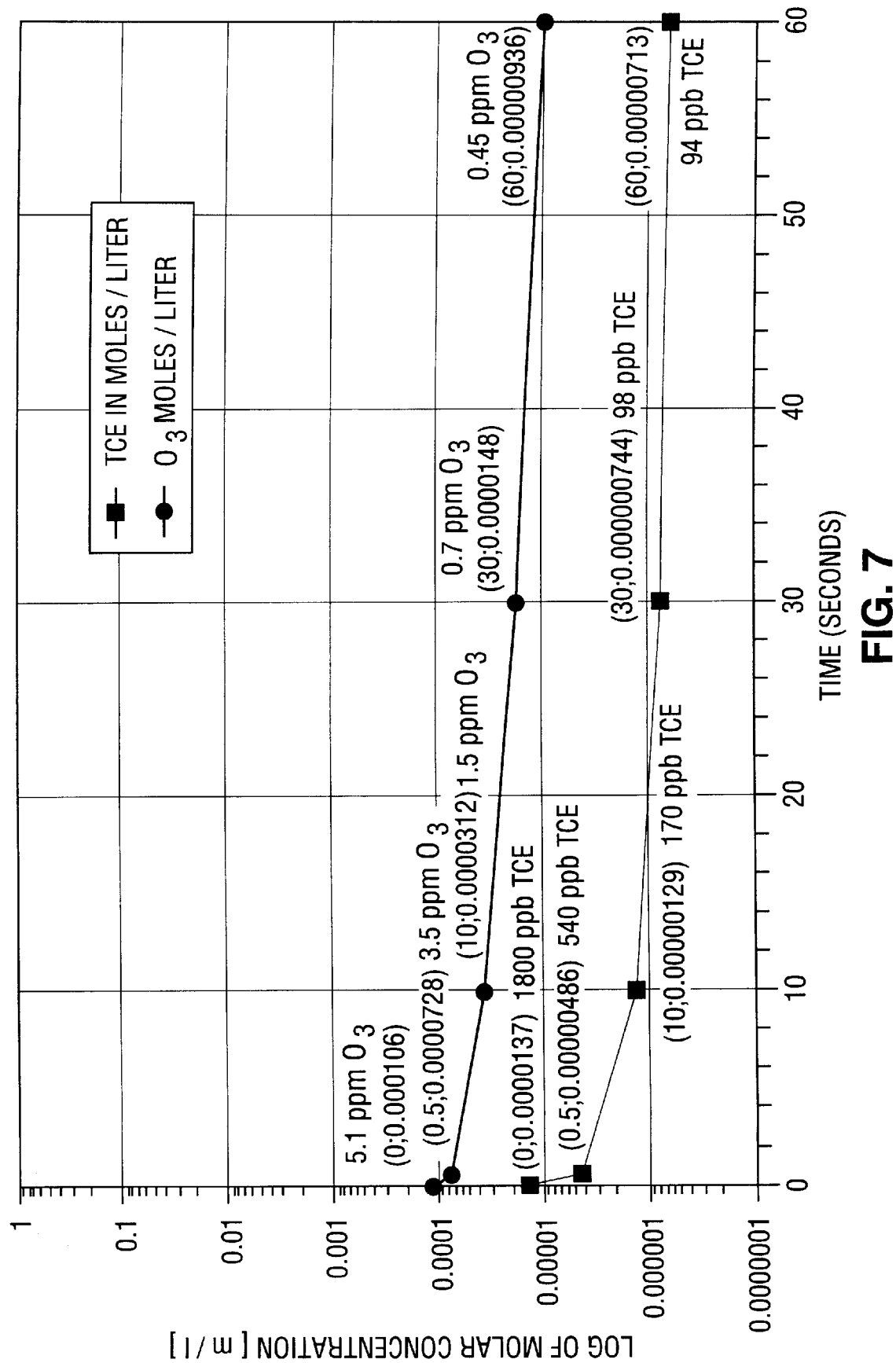
FIG. 7 plots the high intensity mixing/reaction residence time versus the log of molar concentration of both ozone and trichloroethylene in water treated in a single high intensity mixing/reaction stage in accordance with the first embodiment of the present invention.

FIG. 7 plots residence time in high intensity mixing/reaction zone 16 versus the log of molar concentration for both ozone and trichloroethylene, in water treated in a single-stage decontamination apparatus in accordance with the first embodiment of the present invention. FIG. 7 reveals that greater than 90% of trichloroethylene (TCE) (from 1800 ppb to 98 ppb) is oxidized in 30 seconds using an initial $H_2O_2:O_3$ mole ratio of 0.5.

By way of comparison, Glaze and Kang report oxidation of only 10–20% of TCE in this same time in their conventional oxidation system.

During and immediately after high intensity mixing, ozone reacts with hydrogen peroxide rapidly to reduce the concentration of ozone present in the contaminated water flow. However as discussed above in connection with reaction (1), excess residual ozone present in the contaminated water flow can also react with bromide to form hypobromite. Thus, in order to ensure that bromate formation is minimized, the amount of residual ozone present in high intensity mixing/reaction zone 16 is monitored and controlled by oxidation adjustment means 20.

Specifically, oxidation adjustment means 20 analyzes the ozone concentration present in high intensity mixing/reaction zone 16 following high intensity mixing and maintains the concentration of residual ozone at 1.0 ppm or less by adjusting the amounts of ozone and/or hydrogen peroxide provided to injection port 14 by ozone source 8 and hydrogen peroxide source 10. Maintaining residual ozone at about 1 ppm or less allows bromate concentration to be kept below 20 ppb, and preferably below 10 ppb.

5. Multistage Oxidation

After residing for a time in high intensity mixing/reaction zone 16, the water exits high intensity mixing/reaction stage 6 through effluent pipe 32. Depending upon the particular application for decontamination system 2, effluent pipe 32 may lead out of decontamination system 2 or to either post-oxidation treatments such as granulated activated carbon columns or additional high intensity mixing/reaction stage(s).

Treating the contaminated water in a series of high intensity mixing/reaction stages provides several important advantages. First, multistage oxidation allows less ozone to be introduced at each stage in the decontamination process as compared with a single-stage process. The ability to reduce ozone concentrations introduced at each stage reduces the amount of ozone wasted, rendering a multi-stage decontamination process or apparatus in accordance with the present invention more efficient and economical to operate.

A second advantage is the production of lower levels of bromate. Because lower amounts of ozone are introduced at each stage of a multistage decontamination process, less residual ozone remains to react with bromide at each stage to form unwanted hypobromite. The reduction of residual ozone levels thus acts to suppress the formation of bromate.

A third advantage is that more contaminants are destroyed in multistage treatment according to the invention than by a single stage process that introduces the same amount of oxidant into the contaminated water flow. This is best illustrated in FIG. 8.

Figure 8:
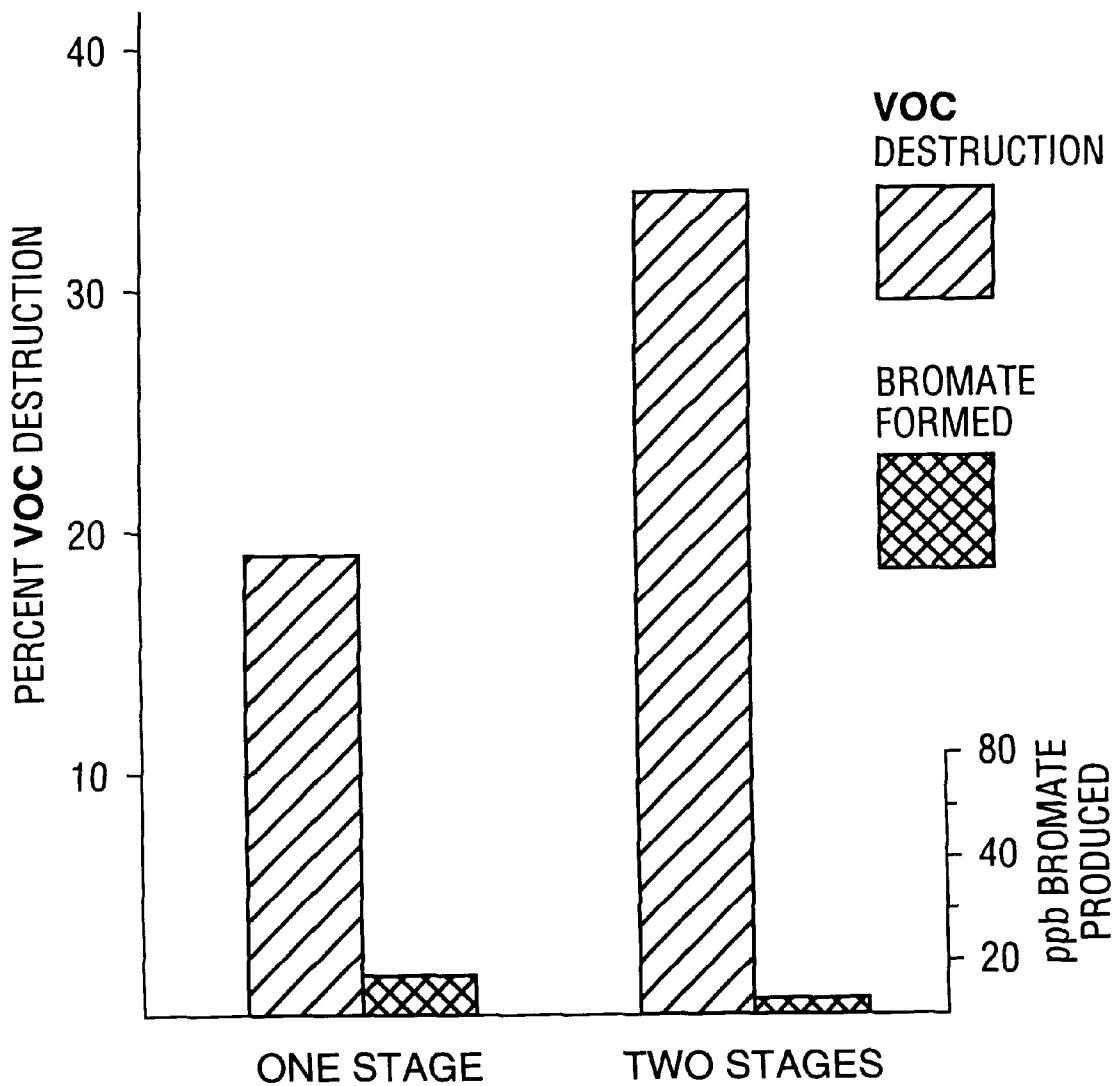
FIG. 8 compares the percentage of VOC destruction and the formation of bromate for a one stage and a two-stage decontamination system in accordance with the first embodiment of the present invention.

FIG. 8 compares the percentage of VOC destruction and the formation of bromate for a one stage and a two-stage decontamination system in accordance with the 1000 GPM capacity model of the first embodiment of the present invention. In the single stage process, 0.875 ppm of ozone was injected by a single injector. In the two stage process, 0.375 ppm of ozone was injected by each of the injectors.

FIG. 8 reveals that the two stage process achieved a percentage of VOC destruction (≈34%) significantly higher than that of the single stage process (≈19%). Moreover, the two stage process formed significantly less bromate (≈5 ppb) than did the single stage process (≈20 ppb). Furthermore, the two stage process consumed less total ozone (0.75 ppm) than did the single stage system (0.875 ppm).

As described above, a multistage decontamination process in accordance with the present invention is superior to single stage oxidation in almost all respects. However, the total number of high intensity mixing/reaction stages employed depends on the particular COD present in the water and the extent of elimination of COD required.

6. "Up Front" Injection of Hydrogen Peroxide

Figure 9:
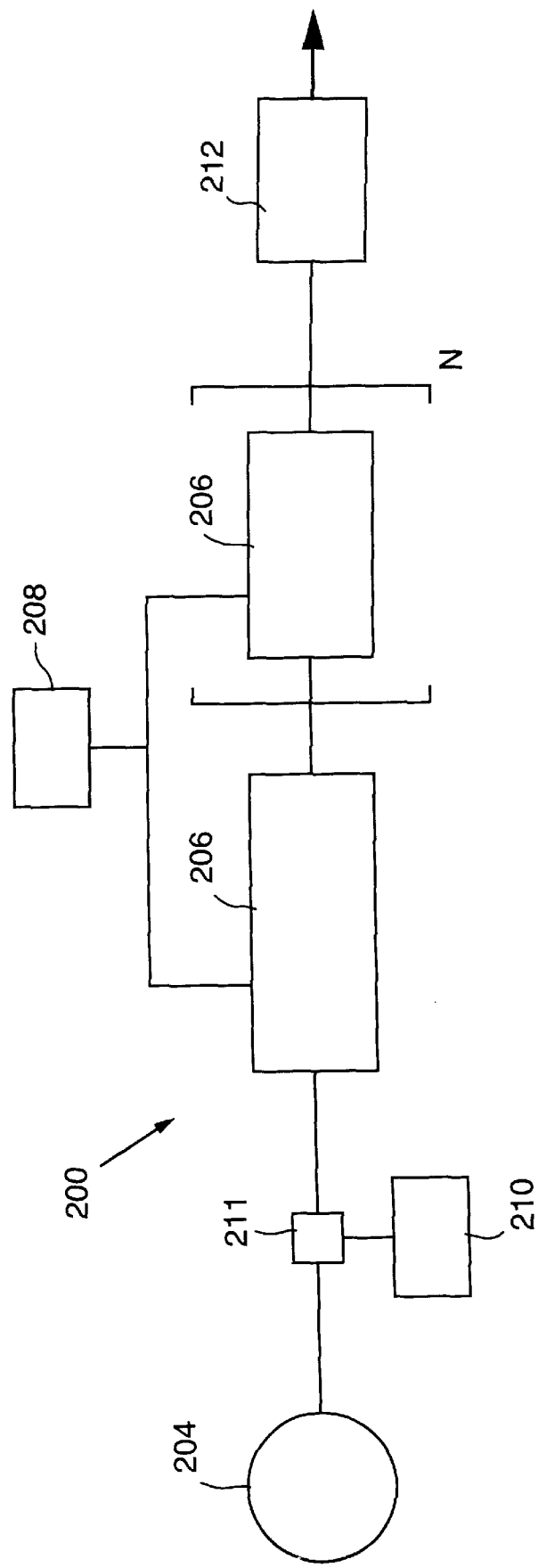
FIG. 9 illustrates a multistage decontamination system in accordance with the second embodiment of the present invention.

FIG. 9 shows a diagram of the implementation of a multistage water decontamination system in accordance with a second embodiment of the present invention. Decontamination system 200 receives contaminated water from a contaminated water source 204. Decontamination system 200 includes a hydrogen peroxide source 210, a single hydrogen peroxide injection port 211, at least two high intensity mixing reaction stages 206, an ozone source 208, and an optional post-oxidation treatment area 212.

The second embodiment of the present invention depicted in FIG. 9 is similar to the first embodiment, except that hydrogen peroxide is introduced into the contaminated water from hydrogen peroxide source 204 in a single, "up front" injection upstream of the first high intensity mixing/reaction stage 206 in which ozone is injected. That is, all of the hydrogen peroxide is injected before any of the ozone is injected into the water at high intensity mixing/reaction stages 206.

TABLE 1 below lists data illustrating the effect of using high intensity mixing/reaction stage in conjunction with "up front" decontamination on levels of VOC contaminants 1,4 dioxane and methyl tert-butyl ether (MTBE). The data of TABLE 1 were obtained with a nine stage "up front" decontamination system at a flow rate of 10 GPM, utilizing the smaller capacity system of the present invention.

TABLE 1

Reduction of 1,4 Dioxane and MTBE Levels Utilizing
"Up Front", 9 Stage System
($H_2O_2$ and $O_3$ concentrations given in ppm;
all other concentrations given in ppb;
All runs at pH = 7.75 except 1* at pH = 7.70.)

| Run | Contaminant | $H_2O_2/O_3$ Mole Ratio | $H_2O_2$ Inj. total $H_2O_2$ injected | $O_3$ Inj. $O_2$ Inj. Per stage | $O_3$ Inj. Total $O_3$ Injected | Contaminant Concentrations Initial | Contaminant Concentrations after stage 1 | Contaminant Concentrations after stage 3 | Contaminant Concentrations after stage 6 | Final |
|---|---|---|---|---|---|---|---|---|---|---|
| 1* | 1,4 dioxane | 4.01 | 7.82 | 0.30 | 2.76 | 38 | 32 | 19 | 8.2 | 4.7 |
| 2 | 1,4 dioxane | 4.23 | 8.13 | 0.30 | 2.71 | 80 | 59 | 33 | 10 | 5.6 |
| 3 | MTBE | 4.24 | 8.05 | 0.30 | 2.68 | 311.9 | 275.9 | 194.8 | 94.8 | 42 |
| 4 | MTBE | 3.24 | 8.05 | 0.40 | 3.51 | 311.9 | N/A | N/A | N/A | 30.3 |
| 5 | MTBE | 4.22 | 8.42 | 0.30 | 2.82 | 175 | N/A | N/A | N/A | 17.1 |

TABLE 1 reveals the significant decontamination effects achieved by the "up front" system. Specifically, several of the above runs show contamination reduced by in excess of 90% over tial levels.

TABLES 2 and 3 illustrate the effect of using a nine stage "up front" decontamination system on levels of VOC contaminants PCE, TCE, $C_6H_6$, $C_7H_8$, $C_8H_{10}$, xylene, and MTBE. TABLE 2 reflects data from decontamination utilizing the smaller capacity high intensity mixing/reaction stages at a flow rate of 3 GPM. TABLE 3 reflects data from decontamination utilizing the smaller capacity high intensity mixing/reaction stages at a flow rate of 10 GPM.

TABLE 2

Reduction of VOC Contamination Levels
($H_2O_2$ and $O_3$ concentrations given in ppm; All other concentrations given in ppb unless
otherwise noted; pH = 7.40; flow rate = 3 GPM; total initial [VOC] 17.2 ppm;
total $[O_3]$ = 88.8 ppm,; $[O_3]$ = 7.00% v/v)

| Run # | Time | $H_2O_2$ ppm | $H_2O_2:O_3$ Mole Ratio | Contaminant Concentrations INITIAL PCE | TCE | $C_6H_6$ | $C_7H_8$ | $C_8H_{10}$ | xylene | MTBE | Br |
|---|---|---|---|---|---|---|---|---|---|---|---|
| 1 | 17:15 | 188.7 | 3 | 321 | 268 | 394 | 870 | 2330 | 3020 | 6460 | 159 |
| 2 | 19:15 | 188.7 | 3 | 316 | 271 | <10 | 6370 | Not Added | Not Added | 5630 | NA |
| 3 | 19:40 | 125.8 | 2 | 321 | 278 | <10 | 6970 | Not Added | Not Added | 5580 | NA |
| 4 | 20:15 | 62.9 | 1 | 373 | 294 | <10 | 6140 | Not Added | Not Added | 4480 | NA |

| Run # | Time | $H_2O_2$ ppm | $H_2O_2:O_3$ Mole Ratio | Contaminant Concentrations AFTER STAGE 4 PCE | TCE | $C_6H_6$ | $C_7H_8$ | $C_8H_{10}$ | xylene | MTBE |
|---|---|---|---|---|---|---|---|---|---|---|
| 1 | 17:15 | 188.7 | 3 | 26.5 | 7.7 | <0.5 | 1.3 | <0.5 | <0.5 | 1500 |
| 2 | 19:15 | 188.7 | 3 | 28.3 | 6.1 | <0.5 | 4.7 | <0.5 | <0.5 | 1140 |
| 3 | 19:40 | 125.8 | 2 | 27 | 6.5 | <0.5 | 70.6 | <0.5 | <0.5 | 636 |
| 4 | 20:15 | 62.9 | 1 | 13.4 | 2.2 | <0.5 | 26.7 | <0.5 | <0.5 | 372 |

| Run # | Time | $H_2O_2$ ppm | $H_2O_2:O_3$ Mole Ratio | Contaminant Concentrations FINAL PCE | TCE | $C_6H_6$ | $C_7H_8$ | $C_8H_{10}$ | xylene | MTBE |
|---|---|---|---|---|---|---|---|---|---|---|
| 1 | 17:15 | 188.7 | 3 | 2.6 | <0.5 | <0.5 | <0.5 | <0.5 | <0.5 | 69.9 |
| 2 | 19:15 | 188.7 | 3 | 3 | <0.5 | <0.5 | <0.5 | <0.5 | <0.5 | 58.3 |
| 3 | 19:40 | 125.8 | 2 | <0.5 | <0.5 | <0.5 | <0.5 | <0.5 | <0.5 | 61.2 |
| 4 | 20:15 | 62.9 | 1 | <0.5 | <0.5 | <0.5 | <0.5 | <0.5 | <0.5 | 66.4 |

TABLE 3

Reduction of VOC Contamination Levels,
($H_2O_2$ and $O_3$ concentrations given in ppm; contaminant concentrations given in ppb;
"NP" indicates not present; "NS" indicates not sampled; flow rate = 10 GPM)

| Run # | Time | pH | Total [VOC] | $H_2O_2:O_3$ mole ratio | Total $H_2O_2$ | [O3] % | Total $O_3$ | Contaminant Concentrations INITIAL |||||||
|---|---|---|---|---|---|---|---|---|---|---|---|---|---|---|
| | | | | | | | | PCE | TCE | $C_6H_6$ | $C_7H_8$ | $C_8H_{10}$ | Xylene | MTBE |
| 1 | 16:55 | 749 | 8.1 | 2 | 52.9 | 6.00 | 44.4 | 178 | 174 | <5 | 1640 | NP | NP | 2350 |
| 2 | 17:20 | 743 | 8.1 | 1.95 | 31.5 | 3.04 | 22.2 | 166 | 174 | <5 | 1470 | NP | NP | 2190 |
| 3 | 18:15 | 740 | 4.05 | 2 | 31.5 | 3.03 | 22.2 | 181 | 180 | 113 | 942 | NP | NP | 723 |
| 4 | 18:30 | 742 | 4.84 | 1.25 | 32.1 | 4.84 | 36.3 | 186 | 191 | 85.8 | 872 | NP | NP | 966 |

| Run # | Time | pH | Total [VOC] | $H_2O_2:O_3$ mole ratio | Total $H_2O_2$ | [O3] % | Total $O_3$ | Contaminant Concentrations AFTER STAGE 4 |||||||
|---|---|---|---|---|---|---|---|---|---|---|---|---|---|---|
| | | | | | | | | PCE | TCE | $C_6H_6$ | $C_7H_8$ | $C_8H_{10}$ | Xylene | MTBE |
| 1 | 16:55 | 749 | 8.1 | 2 | 52.9 | 6.00 | 44.4 | 30.6 | 40 | <2.5 | 16 | NP | NP | 383 |
| 2 | 17:20 | 743 | 8.1 | 1.95 | 31.5 | 3.04 | 22.2 | 58 | 75.6 | <2.5 | 31.8 | NP | NP | 951 |
| 3 | 18:15 | 740 | 4.05 | 2 | 31.5 | 3.03 | 22.2 | 37 | 5.1 | <0.5 | <0.5 | NP | NP | 277 |
| 4 | 18:30 | 742 | 4.84 | 1.25 | 32.1 | 4.84 | 36.3 | 10.7 | <0.5 | <0.5 | <0.5 | NP | NP | 81.9 |

| Run # | Time | pH | Total [VOC] | $H_2O_2:O_3$ mole ratio | Total $H_2O_2$ | [O3] % | Total $O_3$ | Contaminant Concentrations FINAL ||||||||
|---|---|---|---|---|---|---|---|---|---|---|---|---|---|---|---|
| | | | | | | | | PCE | TCE | $C_6H_6$ | $C_7H_8$ | $C_8H_{10}$ | Xylene | MTBE | $H_2O_2$ |
| 1 | 16:55 | 749 | 8.1 | 2 | 52.9 | 6.00 | 44.4 | 0.75 | <0.5 | <0.5 | <0.5 | NP | NP | 15.1 | 40 |
| 2 | 17:20 | 743 | 8.1 | 1.95 | 31.5 | 3.04 | 22.2 | 8.75 | <0.5 | <0.5 | <0.5 | NP | NP | 164 | 16.8 |
| 3 | 18:15 | 740 | 4.05 | 2 | 31.5 | 3.03 | 22.2 | 1.6 | <0.5 | <0.5 | 0.8 | NP | NP | 10.7 | 19.3 |
| 4 | 18:30 | 742 | 4.84 | 1.25 | 32.1 | 4.84 | 36.3 | <0.5 | <0.5 | <0.5 | 0.6 | NP | NP | <5 | NS |

7. "Simultaneous" vs. "Up Front" $H_2O_2$ Injection

TABLES 4A and 4B compare destruction of PCE in water for "simultaneous" hydrogen peroxide injection in accordance with the first embodiment of the present invention as discussed in connection with FIG. 3, and for "up front" hydrogen peroxide injection in accordance with the second embodiment of the present invention as discussed in connection with FIG. 9. The "simultaneous" system injected a total quantity of hydrogen peroxide at the same time as ozone over multiple stages. The "up front" system injected an equivalent amount of hydrogen peroxide in at a single location upstream of the first of the high intensity mixing/reaction stages in which ozone was injected.

TABLE 4A compares destruction of PCE utilizing "simultaneous" and "up front" injection for a three-stage system utilizing the larger capacity high intensity mixing/reaction stages. TABLE 4B compares destruction of PCE utilizing "simultaneous" and "up front" injection for a nine-stage system utilizing the smaller capacity high intensity mixing/reaction stages.

TABLE 4A

"Simultaneous" vs. "UP Front" Decontamination of PCE
($H_2O_2$ and $O_3$ concentrations given in ppm;
All other concentrations given in ppb;
water flow rate = 1000 GPM)

| | | $H_2O_2$ Injection || $O_3$ Injection || Concentrations |||||
|---|---|---|---|---|---|---|---|---|---|---|
| Run | Mode of $H_2O_2$ Injection | $H_2O_2/O_3$ Mole ratio | Total $H_2O_2$ Added | $O_3$ Inj. at each stage | Total $O_3$ added | Initial [PCE] | Final [PCE] | Initial [Br] | Final [Br] | Final [BrO$_3$] |
| 1 | simultaneous | 3.85 | 6.97 | 0.85 | 2.56 | 770 | 350 | 148 | 140 | 25 |
| 2 | simultaneous | 1.93 | 1.97 | 0.90 | 2.69 | 680 | 180 | 210 | 128 | 70 |
| 3 | up front | 4.13 | 7.88 | 0.90 | 2.69 | 897 | 174 | 229 | 210 | 12 |
| 4 | up front | 4.03 | 7.99 | 0.93 | 2.82 | 661 | 129 | 216 | 207 | 13 |

TABLE 4B

"Simultaneous" vs. "UP Front" Decontamination of PCE
($H_2O_2$ and $O_3$ concentrations given in ppm;
All other concentrations given in ppb;
water flow rate = 5.0 GPM)

| | | | $H_2O_2$ Injection | | $O_3$ Injection | | Concentrations | | | | |
|---|---|---|---|---|---|---|---|---|---|---|---|
| Run | Mode of $H_2O_2$ Injection | pH | $H_2O_2/O_3$ Mole ratio | Total $H_2O_2$ Added | $O_3$ Inj. at each stage | Total $O_3$ added | Initial [PCE] | Final [PCE] | Initial [Br] | Final [Br] | Final [$BrO_3$] |
| 1 | simultaneous | 7.75 | 2.48 | 10.27 | 0.40 | 5.85 | 209 | 7.2 | 152 | 137 | 24 |
| 2 | simultaneous | 7.40 | 2.2 | 7.81 | 0.25 | 8.54 | 194 | 16 | 155 | 128 | 42 |
| 3 | up front | 7.40 | 2.55 | 7.91 | 0.25 | 4.38 | 209 | 13 | 152 | 143 | 12 |
| 4 | up front | 7.76 | 2.25 | 10.57 | 0.40* | 6.25 | 192 | 9.2 | 155 | 143 | 13 |

*0.40 ppm $O_3$ injected stages 1–6; 0.25 ppm $O_3$ injected stages 6–9

Both TABLE 4A and TABLE 4B reveal "up front" injection of hydrogen peroxide produced substantially less bromate. In TABLE 4A, runs 2 and 3 injected an equivalent total amount of $O_3$ (2.69 ppm), but final bromate concentrations utilizing "up front" hydrogen peroxide injection were less than 20% of bromate concentrations generated by the "simultaneous" configuration (12 ppb vs. 70 ppb). Moreover, in runs 1 and 4 the bromate generated by "up front" injection of 2.82 ppm of ozone about 50% of bromate generated during "simultaneous" injection of a total of 2.56 ppm of ozone (13 ppb v. 25 ppb).

Data present in TABLE 4B reinforces this conclusion. Specifically, comparison or runs 1 and 4 reveal that more bromate was formed from "simultaneous" injection of a smaller amount of $O_3$ (5.85 ppm) than from "up front" injection of a larger amount of $O_3$ (6.25 ppm).

8. Variation of $H_2O_2:O_3$ Mole ratio

Other researchers have revealed a correlation between the $H_2O_2:O_3$ mole ratio and the destruction of contaminants and the formation of bromate. For example, in a recent study, Karimi, et al., AWWA Journal, Vol. 89, No. 7, 41–53 (1997) report a relationship between the $H_2O_2:O_3$ mole ratio and percent destruction of contaminates represented by a curve having a maxima of between 0.5–0.6 M $H_2O_2:O_3$. Karimi et al. also reported the lowest level of bromate formation at an $H_2O_2:O_3$ mole ratio of 0.6, where a decrease in the ratio to 0.38 resulted in an increase in bromate formation.

Figure 10:
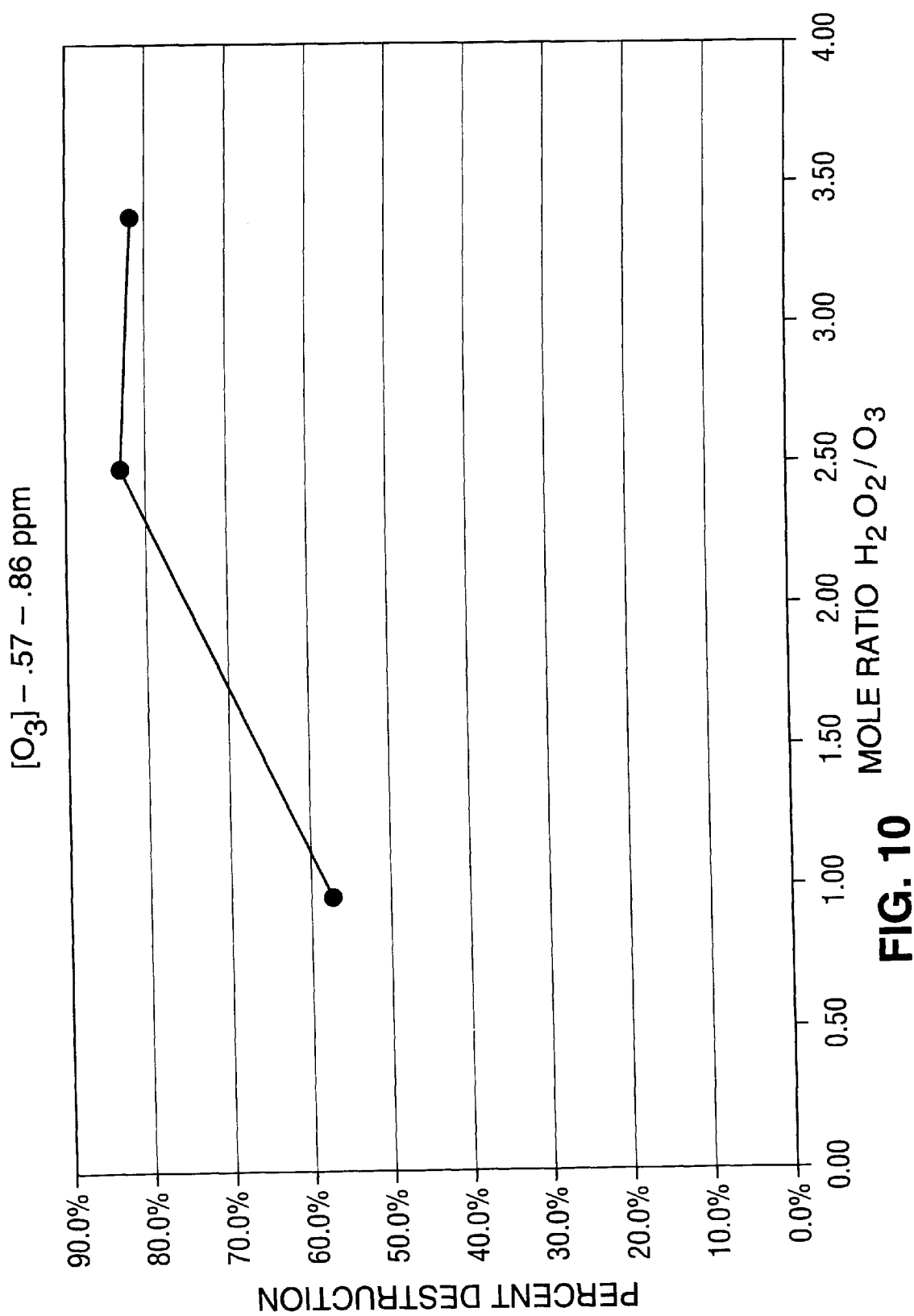
FIG. 10 plots the mole ratio of $H_2O_2:O_3$ versus percent destruction of volatile organic contaminants where the initial ozone concentration is between 0.57 and 0.86 ppm.

FIG. 10 plots the overall $H_2O_2:O_3$ mole ratio versus percent destruction of volatile organic contaminants in a three-stage "simultaneous" decontamination process utilizing the large capacity high intensity mixing/reaction stages. In FIG. 10, ozone was introduced at each high intensity mixing/reaction stage at a concentration of between 0.57 and 0.86 ppm. In marked contrast with Karimi, et al., FIG. 10 reveals increased destruction of contaminants where the overall mole ratio of $H_2O_2:O_3$ is increased to at least 2.5.

Figure 11:
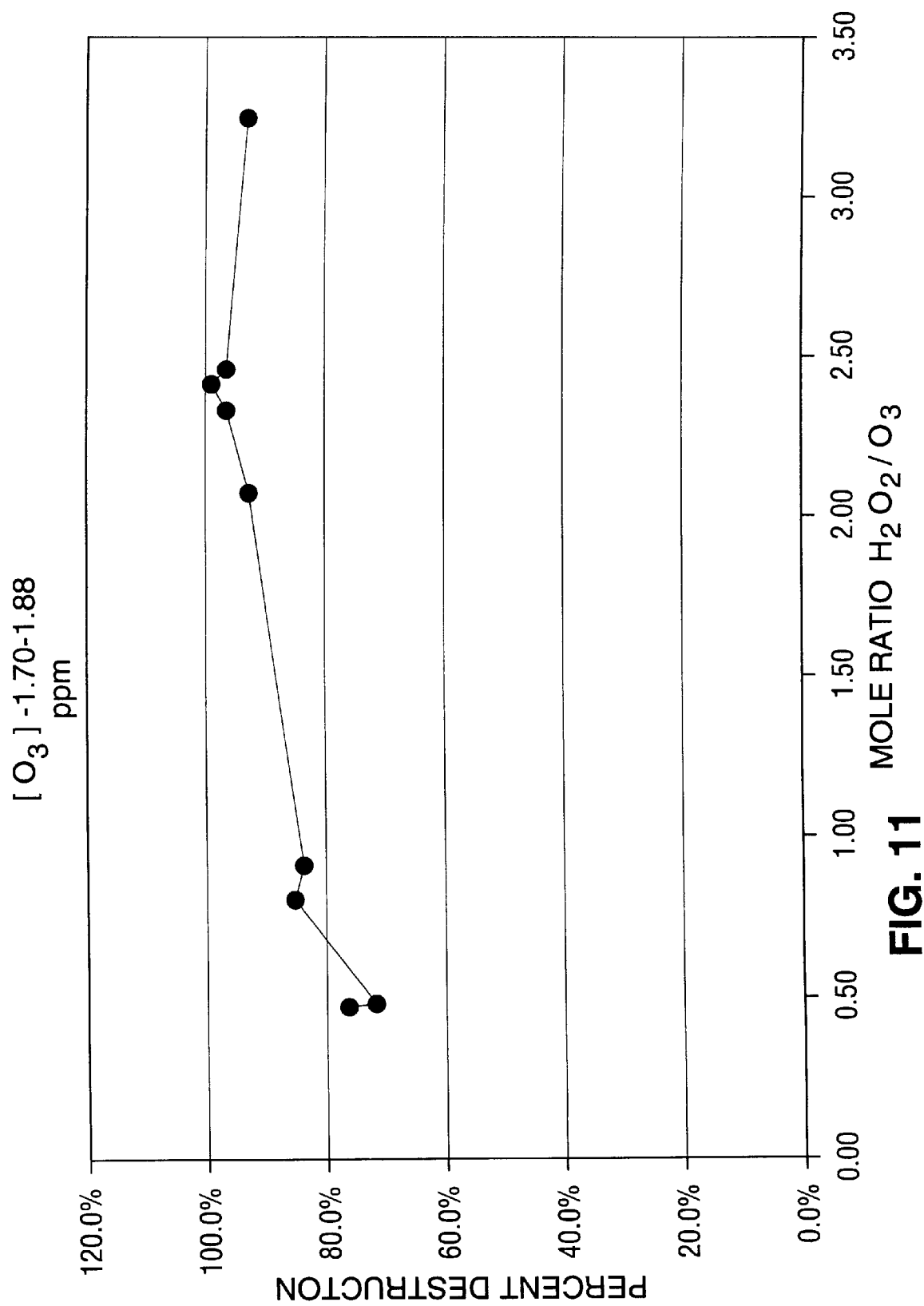
FIG. 11 plots the mole ratio of $H_2O_2:O_3$ versus percent destruction of volatile organic contaminants where the initial ozone concentration is between 1.70 and 1.88 ppm.

FIG. 11 plots the overall mole ratio of hydrogen peroxide to ozone versus percent destruction of volatile organic contaminants in a "simultaneous" decontamination process utilizing the smaller capacity high intensity mixing/reaction stages. In this embodiment, ozone is introduced at each high intensity mixing/reaction stage at a concentration of between 1.70 and 1.88 ppm. Examination of FIG. 11 confirms that increasing the overall mole ratio of $H_2O_2:O_3$ to approximately 2.5 substantially increases the destruction of volatile organic contaminants.

Figure 12:
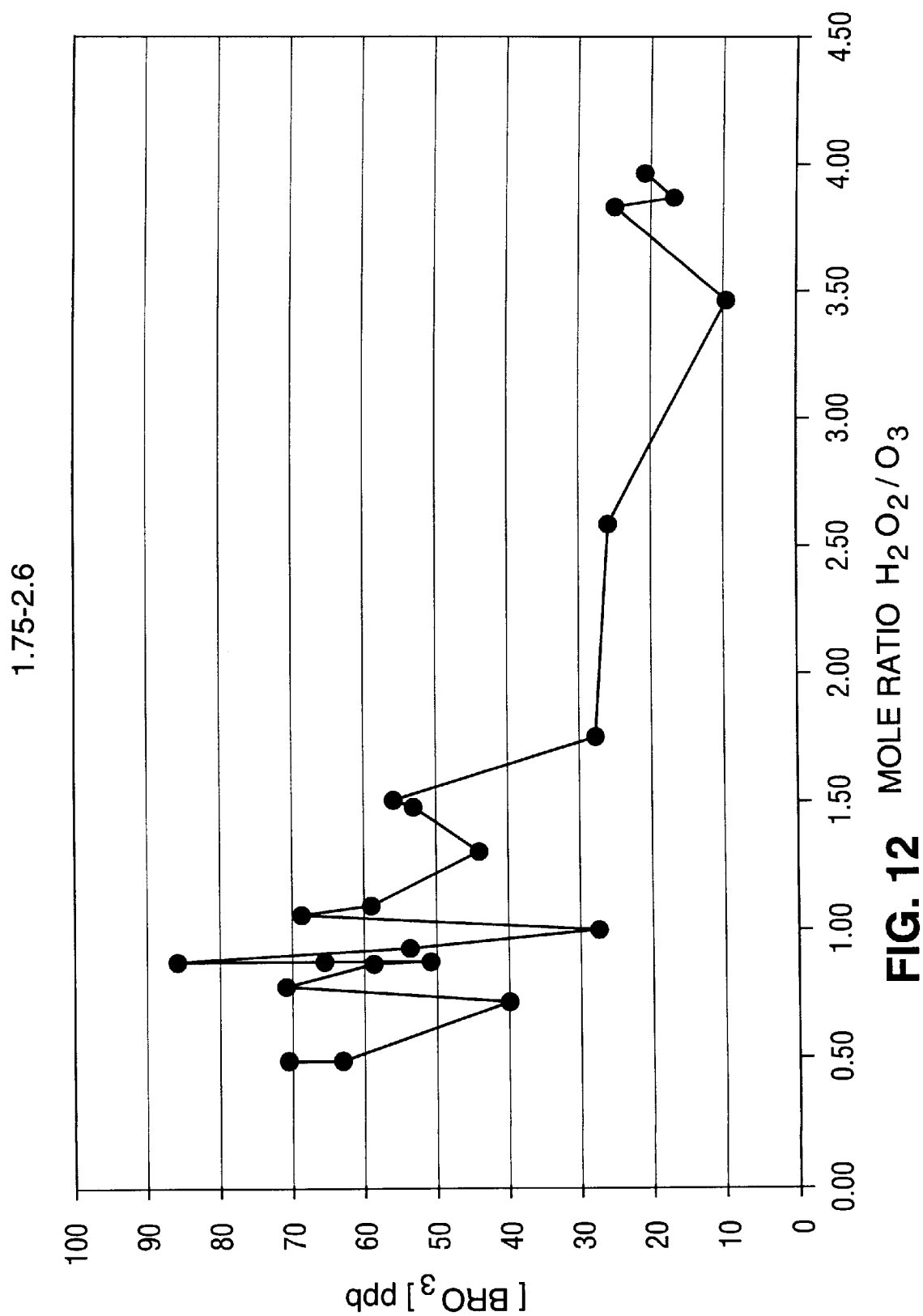
FIG. 12 plots the mole ratio of $H_2O_2:O_3$ versus bromate concentration, where the initial ozone concentration is between 1.75 and 2.6 ppm.

FIG. 12 plots the overall $H_2O_2:O_3$ mole ratio versus bromate concentration, in a three-stage "simultaneous" decontamination process utilizing the larger capacity high intensity mixing/reaction stages, where injection of the ozone results in an initial ozone concentration of between 1.75 and 2.6 ppm. FIG. 12 illustrates that increasing the overall mole ratio of $H_2O_2:O_3$ to 3.5 reduces bromate formation to lower levels than reported by Karimi, et al.

9. Variation of pH

The pH of the contaminated water has a significant effect on both the oxidation of VOC's and the formation of bromate. TABLE 5 illustrates the effect of varying pH upon the oxidation of PCE in a six stage "simultaneous" decontamination system.

TABLE 5

Effect of Varying pH on PCE Oxidation
in "Simultaneous" Six Stage System
($H_2O_2$ and $O_3$ concentrations given in ppm;
All other concentrations given in ppb;
Total $O_3$ Added = 6 ppm; $H_2O_2O_3$ mole ratio = 2)

| Run # | pH | Initial [PCE] | [PCE] after stage 1 | [PCE] after stage 3 | [PCE] after stage 6 |
|---|---|---|---|---|---|
| 1 | 6.5 | 162 | 115 | 56 | <0.5 |
| 2 | 7.4 | 159 | 145 | 35 | 3.4 |
| 3 | 8.5 | 159 | 157 | 67 | 16 |

The data shown in TABLE 5 was compiled by adjusting the pH of the contaminated water with either sulfuric acid or sodium hydroxide upstream of the hydrogen peroxide injection port. In reviewing TABLE 5, it is important to recognize that while more bromate was formed at the lower pH, PCE was also oxidized to below detectable levels. This implies that at lower pH, less ozone is required to complete the oxidation of the PCE, so that less ozone can be introduced at each stage and allowing bromate formation to be minimized.

TABLE 6 also examines the effect of changing pH on the oxidation of PCE. TABLE 6 shows the results of oxidation in a decontamination system utilizing "up front" injection of hydrogen peroxide followed by eighteen high intensity mixing/reaction stages. The apparatus utilized the smaller high intensity mixing/reaction stages in accordance with the second embodiment at a flow rate of 5.5 GPM. The results of TABLE 6 confirm that less ozone is needed to oxidize PCE contamination at low pH.

TABLE 6

Effect of varying pH on PCE Oxidation
in "Up Front" Eighteen Stage System
($H_2O_2$ and $O_3$ concentrations given in ppm;
All other concentrations given in ppb)

| | | $H_2O_2$ Injection | | Ozone Injection | | Concentrations | | | | |
|---|---|---|---|---|---|---|---|---|---|---|
| Run # | pH | Total $H_2O_2$ Added | $H_2O_2:O_3$ Mole Ratio | Ozone Inj. per stage | Total $H_2O_2$ Added | Initial [PCE] | Final [PCE] | Initial [Br] | Final [Br] | Final [$BrO_3$] |
| 1 | 6.53 | 8.5 | 2.11 | 0.18 | 5.69 | 212 | 26.3 | 149 | 144 | <5.0 |
| 2 | 7.03 | 10.5 | 2.27 | 0.2 | 6.53 | 212 | 29.6 | 149 | 146 | 6.6 |
| 3 | 7.38 | 11.9 | 2.14 | 0.24 | 7.84 | 212 | 30.3 | 149 | 146 | <5.0 |

In reviewing TABLE 6, it is important to note that the amount of bromate generated for each pH listed was substantially lower than the amount of bromate generated by the three-stage "simultaneous" configuration as shown in TABLE 4. This result is likely attributable to the fact that the same total quantity of ozone was added over 18, rather than 3 stages, substantially reducing the amount of excess ozone present at each stage.

Figure 13:
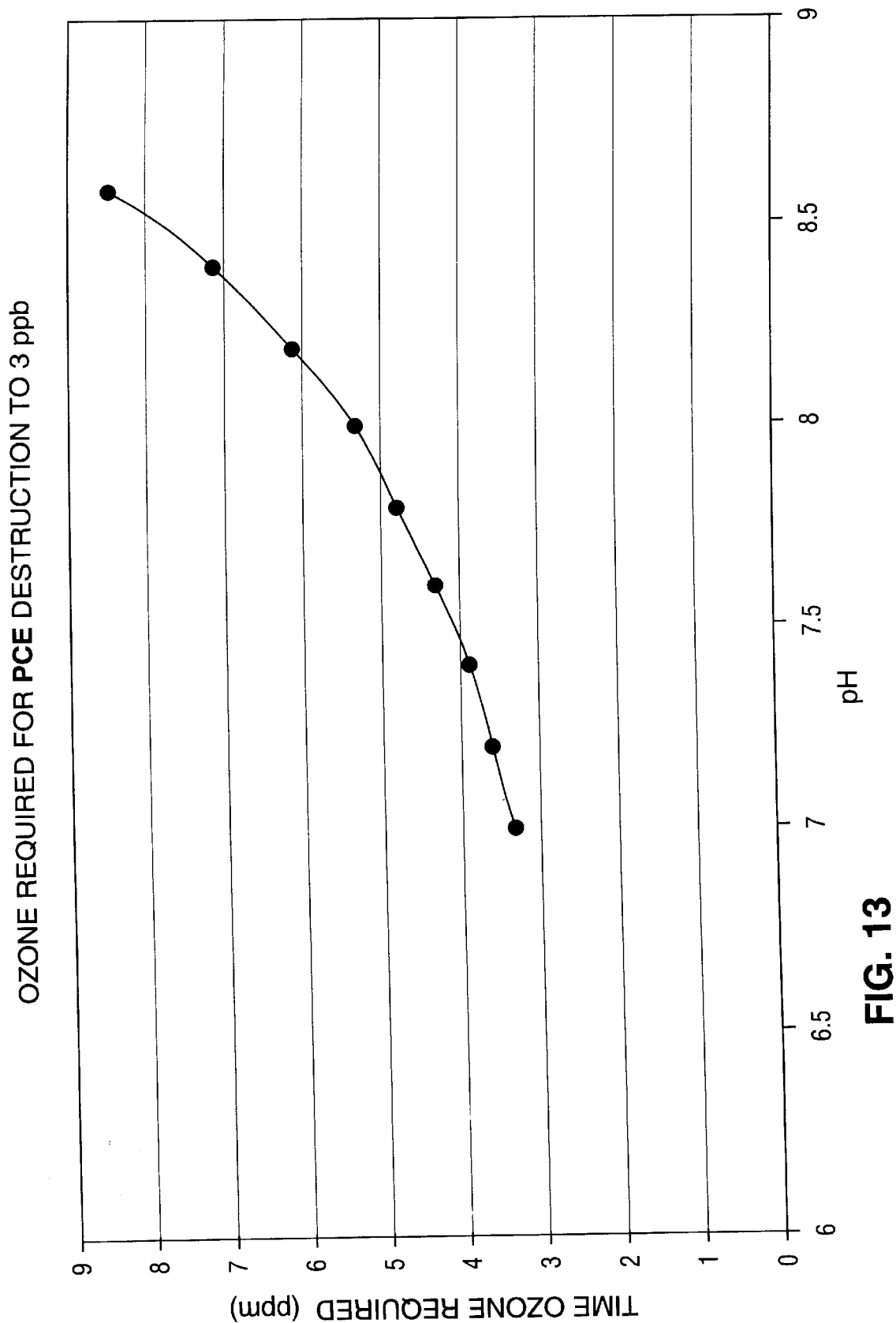
FIG. 13 plots pH versus the amount of ozone required to reduce polychloroethylene (PCE) contamination to 3 ppb from an initial concentration of 200 ppb.

FIG. 13 plots pH versus the amount of ozone required in order to reduce PCE contamination to 3 ppb from an initial concentration of 200 ppb. The data points of FIG. 13 were obtained from a nine stage "up front" decontamination system utilizing smaller capacity mixing/reaction stages at a flow rate of 5.5 GPM.

FIG. 13 shows that the total amount of ozone necessary to eliminate a given initial concentration of PCE declined significantly with falling pH. And because less ozone is needed to accomplish decontamination at such low pH's, less bromate will be formed under these conditions.

10. Post-Oxidation Treatment

The decontamination system described above may be utilized by itself, or in combination with various post-oxidation treatments.

In some applications, rapid and complete oxidation of COD according to the present invention may entirely eliminate the need for any post-oxidation treatment. The corresponding savings in materials constitutes a further advantage of the process and apparatus of the present invention. However, the freedom to dispense entirely with post-oxidation treatment ultimately depends upon the nature of the particular COD present in the water flow, and the final water quality desired.

In other applications, additional post-oxidation treatments may be employed to remediate contamination. FIG. 3 depicts the use of decontamination system 6 in conjunction with such a post-oxidation treatment area 12.

One example of post oxidation treatment of contaminated water is passage of the water through granulated activated carbon. Granulated activated carbon (GAC) is a solid material having a tremendous amount of surface area relative to its size. The large surface area offered by GAC permits this material to bind with a wide variety of substances, removing them from the water flow. Different varieties of GAC differ from each other depending upon such factors as the effective surface area, and the raw material from which the GAC is generated.

It has been discovered that injection and high intensity mixing of ozone and hydrogen peroxide, followed by passage through GAC, may filter certain contaminants that are particularly resistant to oxidation. Specifically, bromate and perchlorate may be removed in this manner.

Figure 14:
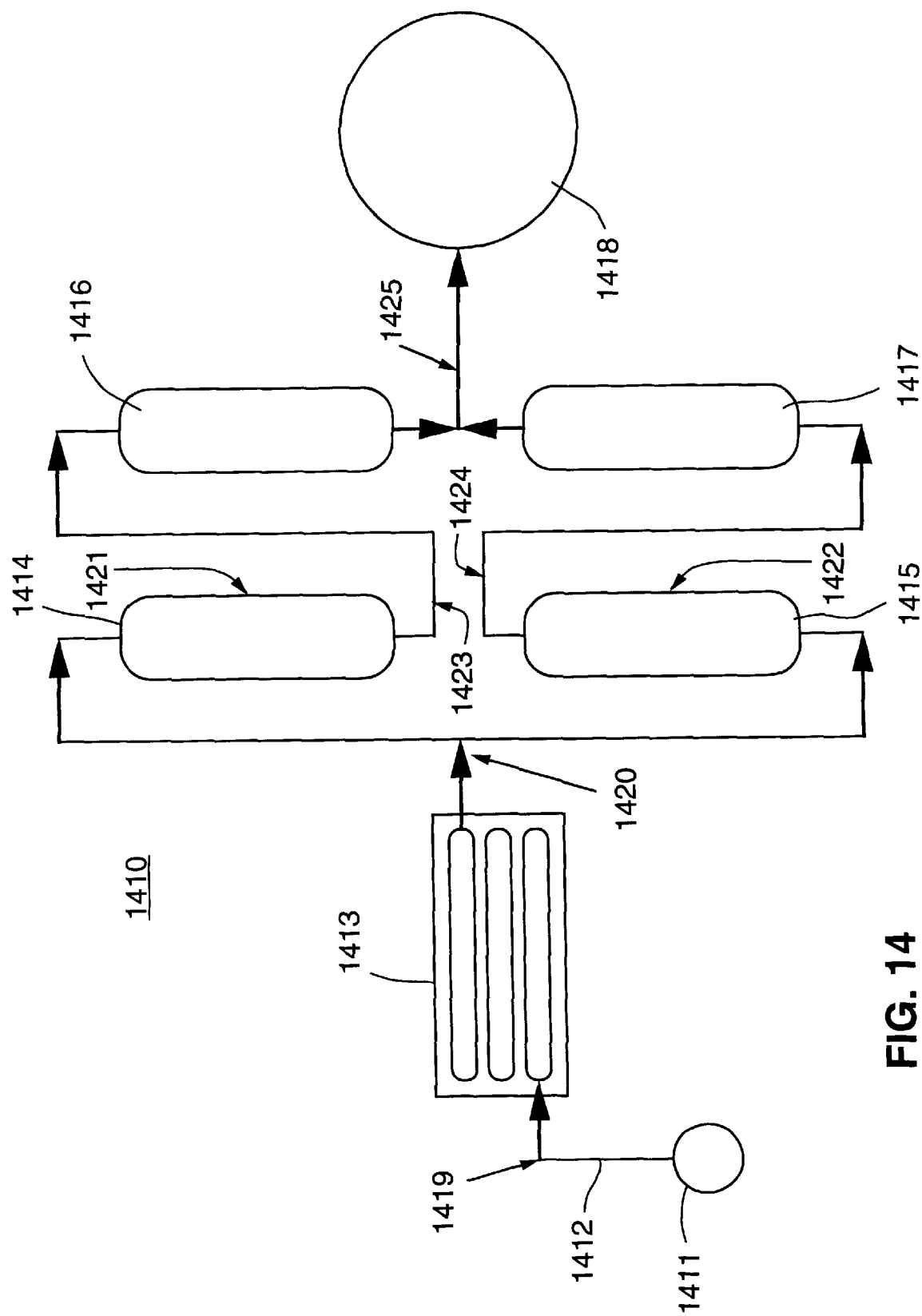
FIG. 14 shows the configuration of a pilot plant project treatment installation in which perchlorate and bromate present in a contaminated water flow was removed by AOP treatment followed by passage though granulated activated carbon.

FIG. 14 shows the configuration of a pilot plant project treatment installation in which perchlorate and bromate present in a contaminated water flow was removed by AOP treatment followed by passage though granulated activated carbon. Water was pumped from well 1411 through conduit 1412 to mixing and reaction system 1413. Both ozone and hydrogen peroxide were introduced to the water flow within oxidation mixing and reaction system 1413.

Water exiting mixing and reaction system 1413 was then split into two streams. Each stream passed though separate lead GAC beds 1414 and 1415 and lag GAC beds 1416 and 1417. GAC beds 1414, 1415, 1416, and 1417 contained SP18 GAC manufactured by Northwest Carbon of Red Bluff, Calif. Following post-oxidation treatment, the water streams were reunited and stored in 2,000,000 gallon reservoir 1418.

Pilot plant project treatment installation 1410 included the following sample points:

| Sample Point | Location |
|---|---|
| 1419 | well 1411 |
| 1420 | after reaction system 1413 |
| 1421 | mid-point of lead GAC bed 1414 |
| 1422 | mid-point of lead GAC bed 1415 |
| 1423 | effluent of lead GAC bed 1414 |
| 1424 | effluent of lead GAC bed 1415 |
| 1425 | effluent of lag GAC beds 1416 and 1417 |

Removal of perchlorate and bromate utilizing the present invention is discussed in detail below.

A. Perchlorate Removal

Perchlorate ($ClO_4^-$), in the form of ammonium perchlorate ($NH_4^+ClO_4^-$), has been widely used in the manufacture of rocket fuel. Perchlorate contamination of groundwater supplies is associated with leakage of ammonium perchlorate stored at aerospace industry manufacturing sites. In dilute solutions, perchlorate is an inert ion and does not pose the risk of ignition or explosion. Unfortunately however, this inert character enables dilute perchlorates introduced in groundwater aquifers to persist without complete degradation by the surrounding environment.

Adverse health effects relating to ingestion of perchlorates have recently been documented. The primary health hazard associated with ingestion of perchlorate is hypothyroidism. It has been observed that at sufficient concentrations, perchlorate can interfere with the thyroid gland's ability to assimilate environmental iodine and produce thyroid hormones. Because of its ability to inhibit iodine uptake, perchlorate is in fact used in the treatment of hyperthyroidism.

Based upon hazards to human health posed by perchlorate exposure, the California Department of Health Services has set a provisional action level for perchlorates at 18 ppb. (California Department of Health Services Division of Drinking Water and Environmental Management Drinking Water Program Perchlorate in Drinking Water Basis of DHS' Provisional Action Level May 1997, DHS Publ., 1997). Because health risks associated with perchlorate contaminated drinking water have only recently been recognized, no known methods exist for effective large-scale removal of this contaminant from water.

Groundwater contaminated by perchlorates was treated by an apparatus in accordance with one embodiment of the present invention. TABLE 7 shows the results of this treatment.

TABLE 7

Perchlorate Concentration (ppb) at Various Sample Points of Pilot Project Installation
("N/A" means data not available; "ND" means below detectable levels)

| Volume H$_2$O Through System (Mgal) | 1419 | 1420 | 1421 | 1422 | 1423 | 1424 | 1425 |
|---|---|---|---|---|---|---|---|
| 80 | 64 | 64 | 16 | N/A | 45 | 10 | 17 |
| 120 | 66 | 66 | 12 | N/A | 39 | 9 | 17 |
| 158 | 68 | 68 | 11 | N/A | 36 | 9 | 16 |
| 235 | 65 | N/A | 16 | 19 | 42 | 13 | 24 |
| 392 | 73 | ND | 12 | 12 | 33 | 13 | 20 |
| 761 | N/A | N/A | 14 | 9.9 | 25 | 7.8 | 10 |
| 1654 | 72 | N/A | 12 | 8.2 | 23 | 8.2 | 9.5 |

TABLE 7 illustrates significant reduction of perchlorate concentration at sample points 1419 through 1425 of pilot plant configuration 1410. An overall reduction in perchlorate was observed between well feed sample point 1419 and combined lag GAC bed output sample point 1425.

TABLE 7 also reveals interesting differences in perchlorate concentration at the midpoint sample points 1421 and 1422, and effluent sample points 1423 and 1424, of lead GAC beds 1414 and 1415. This indicated removal of the perchlorate was likely taking place rapidly at the beginning of the lead GAC bed and that due to perchlorate saturation of carbon in the bottom half of the lead GAC bed, perchlorate was desorbing during the run of pilot plant installation 1410. Such saturation may be attributable to prior use of carbon in beds 1414, 1415, 1416, and 1417 for treatment of water from another well known to have significant perchlorate contamination. This conclusion is buttressed by the fact that perchlorate concentration at the effluent of both lead GAC beds 14 and 15 declined over time, showing regeneration of carbon saturated with perchlorate during the runs with the other contaminated well.

Perchlorate removal by GAC beds 1414, 1415, 1416, and 1417 is an unexpected result. Based upon a six-day run of a well flowing at 850 gpm containing 60 ppb of perchlorate, and a reservoir having 6 ppb of perchlorate, 3.31 lbs of perchlorate would be removed by 40,000 lbs of carbon, resulting in a concentration on the carbon beds of 83 ppm perchlorate.

B. Bromate Removal

Bromide ion (Br$^-$) is ubiquitous. Bromide ion concentration for drinking water sources is approximately 250 µg/L. The presence of bromide ion in a water source may under certain conditions result in the water flows becoming contaminated by the bromate ion (BrO$_3^-$).

Bromate has recently been recognized as a carcinogen by the United States Environmental Protection Agency, which has established maximum tolerable levels of 10 ppb. As discussed at length above, the formation of bromate from bromide may be a by-product of exposure of water containing the bromide ion to highly oxidizing conditions such as are found in AOP processes. Therefore, a post-oxidation treatment that removes bromate is highly desirable.

TABLE 8 shows the results of passing a water flow contaminated with bromate through GAC beds as shown in FIG. 14.

TABLE 8

Br and BrO$_3$ Concentrations (ppb) at Various Sample Points of Pilot Project Installation
("ND" indicates below deteatable limits)

| Date | [Br] at 1419 | [BrO$_3$] at 1419 | [Br] at 1420 | [BrO$_3$] at 1420 | [Br] at 1425 | [BrO$_3$] at 1425 |
|---|---|---|---|---|---|---|
| 7/21/97 | 169 | ND | 127 | 63 | 164 | ND |
| 7/28/97 | 185 | ND | 127 | 70 | 184 | ND |
| 8/7/97 | 220 | ND | 127 | 65 | 211 | ND |
| 8/18/97 | 203 | ND | 162 | 88 | 245 | ND |

As expected, water entering oxidizing mixing and reaction system 1413 from well 1411 contained measurable (≈200 ppb) concentrations of the bromide ion, but no detectable quantities of bromate. Following exposure to highly oxidizing conditions within oxidation mixing and reaction system 1413, the water contained substantial concentrations of bromate and reduced levels of bromide ions, indicating conversion of bromide to bromate.

However, following passage of this water through the GAC beds, bromate concentration dropped again below detectable levels, while bromide ion concentrations were restored to near-original levels. This indicated that bromate generated during oxidation treatment was subsequently converted by the GAC beds back to or near the original bromide ion concentration.

The removal of perchlorate and bromate by GAC beds as shown above in TABLES 7 and 8 is an unexpected result. The mechanism for this removal is unknown at the present time, but may be related to the activation of the carbon in the GAC beds.

11. Conclusion

It is important to recognize that the processes and apparatuses described above represent only specific embodiments of water decontamination apparatuses and systems in accordance with the present invention. For example: 1) the overall number of high intensity mixing/reaction stages; 2) the pressure maintained within the system; 3) the capacity of the high intensity mixing/reaction zone within each stage; 4) the sequence of introduction of the oxidizing agents; 5) the type of high intensity mixer employed; and 6) the concentration of oxidizing agents introduced, can each be varied as disclosed above in order to optimize destruction of contaminants and remain within the scope of the present invention.

It is also important to recognize that the decontamination processes and apparatuses described above are useful not only for eliminating VOC's in a contaminated water flow, the present invention is useful for removing other forms of contamination as well. For example, decontamination in accordance with the present invention may eliminate biological contamination in the form of microorganisms.

Therefore, it is intended that the following claims define the scope of the invention, and that processes and structures within the scope of these claims and their equivalents be covered thereby.

What is claimed is:

1. A water decontamination process, comprising the steps of:

injecting a pressurized flow of hydrogen peroxide into a flow of contaminated water such that the pressure, velocity, and direction of the injected hydrogen peroxide approximately matches the pressure, velocity and direction of the contaminated water flow, said contaminated water comprising oxidizable contaminants and having an inlet water pressure greater than 0 psig;

injecting a pressurized flow of ozone into the flow of contaminated water such that the pressure, velocity, and direction of the injected ozone approximately matches the pressure, velocity and direction of the contaminated water flow;

mixing said ozone with the contaminated water flow at approximately said inlet water pressure to produce a mixture at least 99% homogeneous in ozone and hydrogen peroxide; and repeating the injection of ozone and mixing at approximately the inlet water pressure such that less than 20 ppb of bromate is formed.

2. The process according to claim 1, wherein said homogeneous mixture is achieved in 30 seconds or less.

3. The process according to claim 1, wherein said homogeneous mixture is achieved in less than 1 second.

4. The process according to claim 1, wherein hydrogen peroxide and ozone are injected into the contaminated water flow with an overall mole ratio of hydrogen peroxide to ozone between approximately 0.1 and 10.

5. The process according to claim 1, wherein hydrogen peroxide an d ozone are injected into the contaminated water flow with an overall mole ratio of hydrogen peroxide to ozone between approximately 0.5 and 6.

6. The process according to claim 1, wherein the pH of the contaminated water flow is below 7.0 upstream of the hydrogen peroxide injection port.

7. The process according to claim 1 further comprising the step of passing the contaminated water through granulated activated carbon following mixing of the ozone.

8. A system for decontaminating contaminated water having an inlet water flow rate and an inlet water pressure of greater than 0 psig, the system comprising:

a hydrogen peroxide injection port introducing hydrogen peroxide into the water at a hydrogen peroxide inlet flow rate approximately equal to the inlet water flow rate and at an inlet hydrogen peroxide pressure approximately equal to the inlet water pressure;

a first high intensity mixing/reaction stage downstream of the hydrogen peroxide injection port, the first high intensity mixing/reaction stage including, a first ozone injection port including an ozone sparge tube projecting into the interior of the injection port for receiving pressurized ozone gas from an ozone source, the ozone sparge tube defining at least one ozone orifice facing downstream with respect to the flow of the contaminated water and introducing ozone into the water at an ozone inlet flow rate approximately equal to the inlet water flow rate and at an inlet ozone pressure approximately equal to the inlet water pressure;

a first high intensity mixing/reaction zone downstream of the first ozone injection port, the first high intensity mixing/reaction zone receiving contaminated water, ozone, and hydrogen peroxide at approximately the inlet water pressure and including a high intensity mixer that creates a uniform mixture of the water, ozone, and hydrogen peroxide while maintaining a flow rate at approximately the inlet water flow rate;

at least one high intensity mixing/reaction stage downstream of the first high intensity mixing/reaction zone; and oxidation adjusting means monitoring the level of residual ozone downstream of each high intensity mixing/reaction stage and adjusting the flow of at least one of hydrogen peroxide into the hydrogen peroxide port and ozone into the ozone injection port of the respective high intensity mixing/reaction stage.

9. The system for decontaminating water according to claim 8, wherein each high intensity mixer includes static mixing elements having a leading edge perpendicular to the ozone sparge tube and defining a first side and a second side, and the ozone sparge tube defining a first and a second hydrogen peroxide orifice, such that ozone injected from the first orifice flows to the first side of the leading edge, and ozone injected from the second orifice flows to the second side of the leading edge.

10. The system for decontaminating water according to claim 8 further comprising at least three consecutive high intensity mixing/reaction stages.

11. The system for decontaminating water according to claim 8 further comprising at least nine consecutive high intensity mixing/reaction stages.

12. The system for decontaminating water according to claim 8, further comprising means for adjusting the pH of the contaminated water to below about 7.0 upstream of the hydrogen peroxide injection port.

13. The system for decontaminating water according to claim 8, further comprising a post oxidation treatment vessel containing granulated activated carbon through which the contaminated water passes.

* * * * *

UNITED STATES PATENT AND TRADEMARK OFFICE
CERTIFICATE OF CORRECTION

PATENT NO.     : 6,024,882
DATED          : February 15, 2000
INVENTOR(S)    : Michael McNeilly et al.

It is certified that error appears in the above-identified patent and that said Letters Patent is hereby corrected as shown below:

Column 22,
Line 33, please change "hydrogen peroxide" to -- ozone --.

Signed and Sealed this

Eighteenth Day of September, 2001

*Attest:*

*Nicholas P. Godici*

*Attesting Officer*

NICHOLAS P. GODICI
*Acting Director of the United States Patent and Trademark Office*